United States Patent
Pustovalov

(10) Patent No.: US 12,395,287 B2
(45) Date of Patent: Aug. 19, 2025

(54) SIGNAL COMPRESSION AND NOISE SHAPING IN A WIRELESS COMMUNICATIONS SYSTEM (WCS)

(71) Applicant: Corning Research & Development Corporation, Corning, NY (US)

(72) Inventor: Evgenii Pustovalov, Saint-Petersburg (RU)

(73) Assignee: ANI Acquisition Sub, LLC, Boca Raton, FL (US)

( * ) Notice: Subject to any disclaimer, the term of this patent is extended or adjusted under 35 U.S.C. 154(b) by 455 days.

(21) Appl. No.: 17/982,910

(22) Filed: Nov. 8, 2022

(65) Prior Publication Data

US 2023/0171051 A1    Jun. 1, 2023

Related U.S. Application Data

(60) Provisional application No. 63/284,032, filed on Nov. 30, 2021.

(51) Int. Cl.
*H04L 5/00*    (2006.01)
*H04W 72/0453*    (2023.01)
(Continued)

(52) U.S. Cl.
CPC ....... *H04L 5/0044* (2013.01); *H04W 72/0453* (2013.01); *H04W 72/21* (2023.01); *H04W 72/23* (2023.01)

(58) Field of Classification Search
CPC ..... H04L 5/0044; H04L 67/025; H04L 69/04; H04W 72/0453; H04W 72/21; H04W 72/23
See application file for complete search history.

(56) References Cited

U.S. PATENT DOCUMENTS 8,923,386 B2    12/2014    Samardzija et al.
9,059,778 B2    6/2015    Ling
(Continued)

FOREIGN PATENT DOCUMENTS

EP    3494757 A1    6/2019
WO    2018/024940 A1    2/2018

OTHER PUBLICATIONS

K. F. Nieman, et al., "Time-domain compression of complex-baseband LTE signals for cloud radio access networks", Proc. IEEE Global Conf. on Signal and Info. Processing, Dec. 2013, pp. 1198-1201.

(Continued)

*Primary Examiner* — Mansour Oveissi
(74) *Attorney, Agent, or Firm* — Greenberg Traurig, LLP; Mammen ("Roy") P. Zachariah

(57) ABSTRACT

Signal compression and noise shaping in a wireless communications system (WCS) is provided. Herein, a block compression circuit is integrated with a noise shaping circuit to concurrently perform downlink/uplink signal compression and noise shaping in the WCS. The block compression circuit performs block scaling compression on the downlink/uplink signal, which can cause a compression noise being distributed across an entire sampling bandwidth of the downlink/uplink signal. As such, the noise shaping circuit is configured to redistribute the compression noise from the entire sampling bandwidth to a selected portion of the sampling bandwidth. Accordingly, the redistributed compression noise can be effectively suppressed and/or filtered out when the downlink/uplink signal is received and decompressed. By concurrently performing block compression and noise shaping on the downlink/uplink signal, it is possible to achieve a good trade-off between compression ratio and (Continued)

latency, without compromising quality metrics of the downlink/uplink signal.

25 Claims, 13 Drawing Sheets

(51) Int. Cl.
*H04W 72/21* (2023.01)
*H04W 72/23* (2023.01)

(56) References Cited

U.S. PATENT DOCUMENTS

| | | | |
|---|---|---|---|
| 9,215,297 B2 | 12/2015 | Ryan et al. | |
| 9,729,215 B2 | 8/2017 | Rahman et al. | |
| 2012/0207206 A1* | 8/2012 | Samardzija | H03M 7/30 |
| | | | 375/240 |
| 2012/0250740 A1 | 10/2012 | Ling | |
| 2016/0270080 A1 | 9/2016 | Zeng et al. | |
| 2017/0093611 A1 | 3/2017 | Arora et al. | |
| 2018/0041327 A1 | 2/2018 | Wolff et al. | |
| 2018/0115348 A1 | 4/2018 | Li et al. | |
| 2018/0359123 A1 | 12/2018 | Kimura et al. | |
| 2019/0123834 A1 | 4/2019 | Zarubinsky et al. | |
| 2019/0335379 A1 | 10/2019 | Joseph et al. | |
| 2019/0342771 A1 | 11/2019 | Zhu et al. | |
| 2020/0182959 A1 | 6/2020 | Markhovsky et al. | |
| 2020/0260524 A1 | 8/2020 | Kim et al. | |
| 2021/0184635 A1* | 6/2021 | Deb | H03F 1/3247 |
| 2022/0174784 A1* | 6/2022 | Ekbatani | H04W 84/042 |

OTHER PUBLICATIONS

O-RAN.WG4.CUS.0-v03.00; O-RAN Fronthaul Working Group; Control, User and Synchronization Plane Specification, Technical Specification; Annex A. Compression methods, 2021, pp. 181-191.

* cited by examiner

600

```
┌─────────────────────────────────────────────────────┐
│ RECEIVE AT LEAST ONE DOWNLINK DIGITAL COMMUNICATIONS│
│ SIGNAL (402D) SAMPLED BASED ON A DOWNLINK SAMPLING  │
│ BANDWIDTH (302) COMPRISING A DOWNLINK IN-BAND       │
│ BANDWIDTH (304) AND A DOWNLINK OUT-BAND             │
│ BANDWIDTH (306)                                     │
│ 602                                                 │
└─────────────────────────────────────────────────────┘
                         ↓
┌─────────────────────────────────────────────────────┐
│ GENERATE A PLURALITY OF DOWNLINK SAMPLE BLOCKS      │
│ (506(1)-506(N)) BASED ON THE AT LEAST ONE DOWNLINK  │
│ DIGITAL COMMUNICATIONS SIGNAL (402)                 │
│ 604                                                 │
└─────────────────────────────────────────────────────┘
                         ↓
┌─────────────────────────────────────────────────────┐
│ COMPRESS EACH OF THE PLURALITY OF DOWNLINK SAMPLE   │
│ BLOCKS (506(1)-506(N)) BASED ON A RESPECTIVE ONE OF │
│ A PLURALITY OF DOWNLINK SCALING FACTORS             │
│ ($S_{DL1}$-$S_{DLN}$) TO GENERATE A RESPECTIVE ONE OF A │
│ PLURALITY OF COMPRESSED DOWNLINK SAMPLE BLOCKS      │
│ (508(1)-508(N))                                     │
│ 606                                                 │
└─────────────────────────────────────────────────────┘
                         ↓
┌─────────────────────────────────────────────────────┐
│ REDISTRIBUTE THE DOWNLINK COMPRESSION NOISE ($N_{DL}$)│
│ ASSOCIATED WITH EACH OF THE PLURALITY OF COMPRESSED │
│ DOWNLINK SAMPLE BLOCKS (508(1)-508(N)) ACROSS A     │
│ SELECTED ONE OF THE DOWNLINK IN-BAND BANDWIDTH (304)│
│ AND THE DOWNLINK OUT-BAND BANDWIDTH (306)           │
│ 608                                                 │
└─────────────────────────────────────────────────────┘
```

FIG. 6

SIGNAL COMPRESSION AND NOISE SHAPING IN A WIRELESS COMMUNICATIONS SYSTEM (WCS)

RELATED APPLICATIONS

The present application claims priority to U.S. Provisional Patent Application Ser. No. 63/284,032, filed on Nov. 30, 2021, and entitled "SIGNAL COMPRESSION AND NOISE SHAPING IN A WIRELESS COMMUNICATIONS SYSTEM (WCS)," which is incorporated herein by reference in its entirety.

BACKGROUND

The disclosure relates generally to signal compression and noise shaping in a wireless communications system (WCS), which can include a fifth-generation (5G) or a 5G new-radio (5G-NR) system and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming radio frequency (RF) antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104. The DAS 104 can be configured to support a variety of communications services that can include cellular communications services, such as fourth generation (4G) and/or fifth generation (5G) radio access network (RAN), wireless communications services, such as RF identification (RFID) tracking, Wi-Fi, local area network (LAN), and wireless LAN (WLAN), wireless solutions (Bluetooth, Wi-Fi, Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a signal source 110, such as for example, a mobile service provider(s) and/or a network operator(s). In this regard, the central unit 108 receives downlink communications signals 112D from the signal source 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the signal source 110.

Because the remote units 106(1)-106(N) include components that require power to operate, such as the RF transmitters/receivers 116(1)-116(N) for example, it is necessary to provide power to the remote units 106(1)-106(N). In one example, each remote unit 106(1)-106(N) may receive power from a local power source. In another example, the remote units 106(1)-106(N) may be powered remotely from a remote power source(s). For example, the central unit 108 in the WCS 100 in FIG. 1 includes a power source 122 that is configured to remotely supply power over the communications links 114 to the remote units 106(1)-106(N). For example, the communications links 114 may be cable that includes electrical conductors for carrying current (e.g., direct current (DC)) to the remote units 106(1)-106(N).

If the WCS 100 is an optical fiber-based DCS, the central unit 108 can be coupled to the remote units 106(1)-106(N) via an optical communications network 124, such as a passive optical network (PON). In this regard, the communications links 114 may by a "hybrid" cable that includes optical fibers for carrying the downlink and uplink communications signals 112D, 112U and separate electrical conductors for carrying current to the remote units 106(1)-106(N).

As mentioned earlier, the DAS 104 can be configured to support 4G and/or 5G RAN services in the remote coverage areas 102(1)-102(N). In this regard, the remote units 106(1)-106(N) can each function as a 4G base station (a.k.a. eNodeB) and/or a 5G base station (a.k.a. gNodeB). The whole spectrum available for 4G and/or 5G networks is divided to multiple wireless channels each assigned to one or more of the remote coverage areas 102(1)-102(N). In this regard, the remote units 106(1)-106(N) are each configured to communicate with the UE 120 in a respective one of the remote coverage areas 102(1)-102(N) in a passband of a respective wireless channel(s) assigned by the signal source 110. For example, a 5G wireless channel can be associated with a bandwidth from 5 MHz to 100 MHz in frequency range one (FR1).

Each of the remote units 106(1)-106(N) is required to meet stringent signal quality requirements as stipulated by standard bodies and/or regulatory authorities. Specifically, signal quality in a 4G/5G system can be measured by such performance metrics as error vector magnitude (EVM) and/or adjacent channel leakage ratio (ACLR).

The EVM, which is typically expressed in decibel (dB), measures a difference between an ideally transmitted constellation point(s) and a constellation point(s) actually received at an antenna port. In the 4G/5G system, the EVM is measured in frequency domain and only valid for a specific wireless channel bandwidth. Understandably, the lower the EVM is, the better the signal quality can be achieved in the passband of the respective wireless channel(s) to thereby support better performance in the remote coverage areas 102(1)-102(N). The ACLR represents a ratio (typically in dB) between signal power in the passband of a wireless channel and signal/noise power in an adjacent wireless channel (e.g., assigned to a neighboring wireless coverage area). In this regard, the lower the ACLR is, the lower the interference can be in the adjacent wireless channel and therefore a better overall network performance can be achieved in the DAS 104.

SUMMARY

Embodiments disclosed herein include signal compression and noise shaping in a wireless communications system (WCS). In embodiments disclosed herein, a block compression circuit is integrated with a noise shaping circuit to concurrently perform downlink/uplink signal compression and noise shaping in a central unit and/or a remote unit(s) in the WCS. More specifically, the block compression circuit is configured to perform block scaling compression on the downlink/uplink signal, which can cause a compression noise being distributed across an entire sampling bandwidth of the downlink/uplink signal. In this regard, the noise shaping circuit is configured to redistribute the compression noise from the entire sampling bandwidth to a selected portion of the sampling bandwidth (e.g., in-band bandwidth or out-band bandwidth). Accordingly, the redistributed compression noise can be effectively suppressed and/or filtered out when the downlink/uplink signal is received and decompressed. By concurrently performing block compression and noise shaping on the downlink/uplink signal, it is possible to achieve a good trade-off between compression ratio and latency, without compromising such quality metrics as error vector magnitude (EVM) and adjacent channel leakage ratio (ACLR) of the downlink/uplink signal.

One exemplary embodiment of the disclosure relates to a central unit in a WCS. The central unit includes a downlink digital compression circuit. The downlink digital compression circuit includes a downlink block compression circuit. The downlink block compression circuit is configured to receive at least one downlink digital communications signal sampled based on a downlink sampling bandwidth comprising a downlink in-band bandwidth and a downlink out-band bandwidth. The downlink block compression circuit is also configured to generate a plurality of downlink sample blocks based on the at least one downlink digital communications signal. The downlink block compression circuit is also configured to compress each of the plurality of downlink sample blocks based on a respective one of a plurality of downlink scaling factors to generate a respective one of a plurality of compressed downlink sample blocks. The downlink digital compression circuit also includes a downlink noise shaping circuit. The downlink noise shaping circuit is configured to cause a downlink compression noise associated with each of the plurality of compressed downlink sample blocks to be redistributed across a selected one of the downlink in-band bandwidth and the downlink out-band bandwidth.

An additional exemplary embodiment of the disclosure relates to a method for supporting signal compression and noise shaping in a WCS. The method includes receiving at least one downlink digital communications signal sampled based on a downlink sampling bandwidth comprising a downlink in-band bandwidth and a downlink out-band bandwidth. The method also includes generating a plurality of downlink sample blocks based on the at least one downlink digital communications signal. The method also includes compressing each of the plurality of downlink sample blocks based on a respective one of a plurality of downlink scaling factors to generate a respective one of a plurality of compressed downlink sample blocks. The method also includes redistributing a downlink compression noise associated with each of the plurality of compressed downlink sample blocks across a selected one of the downlink in-band bandwidth and the downlink out-band bandwidth.

An additional exemplary embodiment of the disclosure relates to a WCS. The WCS includes a plurality of remote units. The WCS also includes a central unit coupled to the plurality of remote units via a transport medium. The central unit is configured to distribute at least one compressed downlink digital communications signal to a respective one or more of the plurality of remote units. The central unit is also configured to receive at least one compressed uplink digital communications signal from the respective one or more of the plurality of remote units. The central unit includes a downlink digital compression circuit. The downlink digital compression circuit includes a downlink block compression circuit. The downlink block compression circuit is configured to receive at least one downlink digital communications signal sampled based on a downlink sampling bandwidth comprising a downlink in-band bandwidth and a downlink out-band bandwidth. The downlink block compression circuit is also configured to generate a plurality of downlink sample blocks based on the at least one downlink digital communications signal. The downlink block compression circuit is also configured to compress each of the plurality of downlink sample blocks based on a respective one of a plurality of downlink scaling factors to generate a respective one of a plurality of compressed downlink sample blocks. The downlink digital compression circuit also includes a downlink noise shaping circuit. The downlink noise shaping circuit is configured to cause a downlink compression noise associated with each of the plurality of compressed downlink sample blocks to be redistributed across a selected one of the downlink in-band bandwidth and the downlink out-band bandwidth.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a flowchart of an exemplary process for supporting signal compression and noise shaping in the WCS of FIG. 2;

DETAILED DESCRIPTION

Embodiments disclosed herein include signal compression and noise shaping in a wireless communications system (WCS). In embodiments disclosed herein, a block compression circuit is integrated with a noise shaping circuit to concurrently perform downlink/uplink signal compression and noise shaping in a central unit and/or a remote unit(s) in the WCS. More specifically, the block compression circuit is configured to perform block scaling compression on the downlink/uplink signal, which can cause a compression noise being distributed across an entire sampling bandwidth of the downlink/uplink signal. In this regard, the noise shaping circuit is configured to redistribute the compression noise from the entire sampling bandwidth to a selected portion of the sampling bandwidth (e.g., in-band bandwidth or out-band bandwidth). Accordingly, the redistributed compression noise can be effectively suppressed and/or filtered out when the downlink/uplink signal is received and decompressed. By concurrently performing block compression and noise shaping on the downlink/uplink signal, it is possible to achieve a good trade-off between compression ratio and latency, without compromising such quality metrics as error vector magnitude (EVM) and adjacent channel leakage ratio (ACLR) of the downlink/uplink signal.

Figure 2:
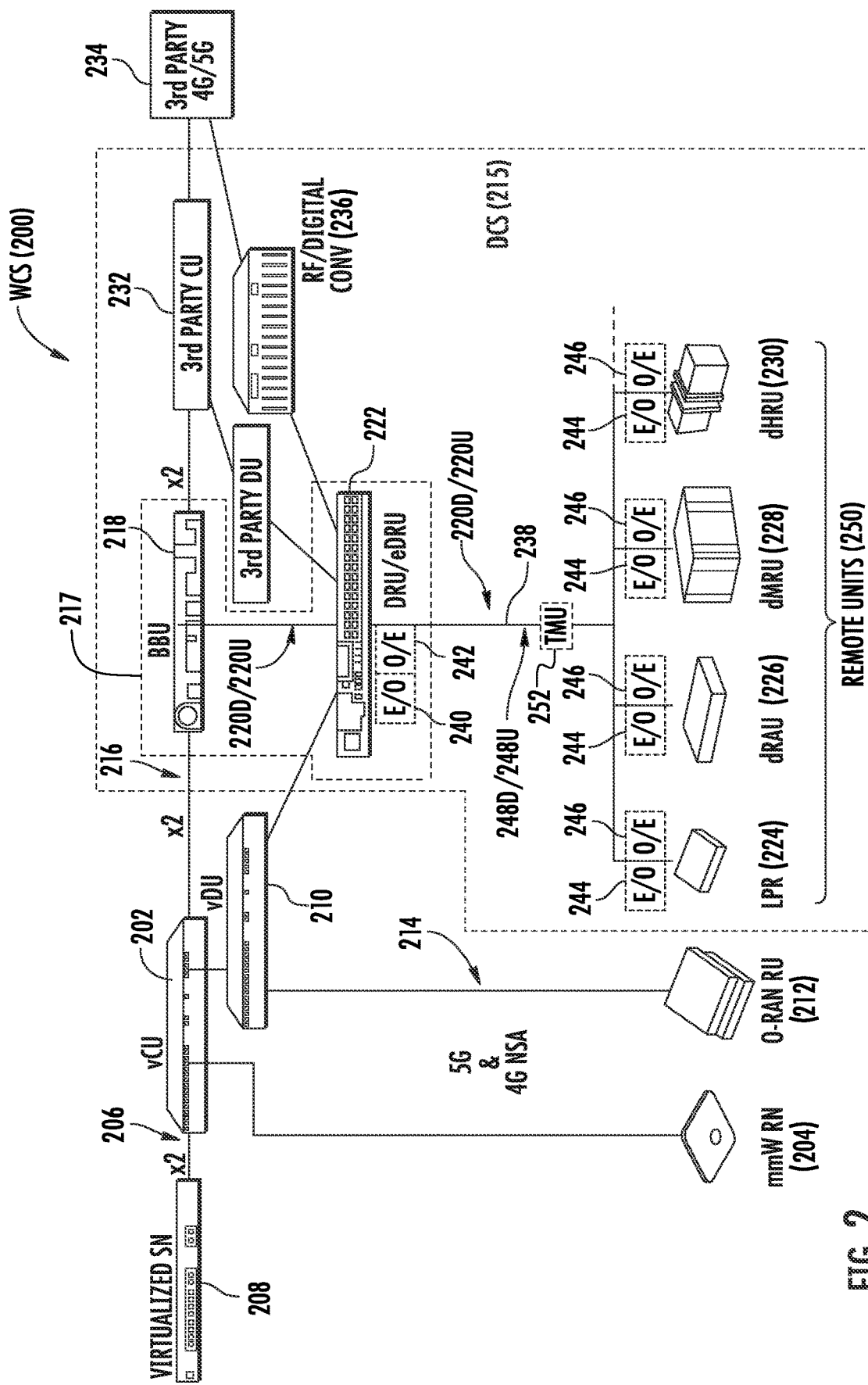
FIG. 2 is a schematic diagram of an exemplary WCS, which can be configured according to any of the embodiments disclosed herein to support signal compression and noise shaping.

In this regard, FIG. 2 is a schematic diagram of an exemplary WCS 200, which can be configured according to any of the embodiments disclosed herein to support signal compression and noise shaping. The WCS 200 supports both legacy 4G LTE, 4G/5G non-standalone (NSA), and 5G standalone communications systems. As shown in FIG. 2, a centralized services node 202 is provided that is configured to interface with a core network to exchange communications data and distribute the communications data as radio signals to remote units. In this example, the centralized services node 202 is configured to support distributed communications services to an mmWave radio node 204. Despite that only one mmWave radio node 204 is shown in FIG. 2, it should be appreciated that the WCS 200 can be configured to include additional numbers of the mmWave radio node 204, as needed. The functions of the centralized services node 202 can be virtualized through an x2 interface 206 to another services node 208. The centralized services node 202 can also include one or more internal radio nodes that are configured to be interfaced with a distribution unit (DU) 210 to distribute communications signals to one or more open radio access network (O-RAN) remote units (RUs) 212 that are configured to be communicatively coupled through an O-RAN interface 214. The O-RAN RUs 212 are each configured to communicate downlink and uplink communications signals in a respective coverage cell.

The centralized services node 202 can also be interfaced with a distributed communications system (DCS) 215 through an x2 interface 216. Specifically, the centralized services node 202 can be interfaced with a central unit 217.

The central unit 217 includes a digital baseband unit (BBU) 218 that can provide a digital signal source to the centralized services node 202. The digital BBU 218 may be configured to provide a signal source to the centralized services node 202 to provide downlink communications signals 220D to a digital routing unit (DRU) 222, which is also included in the central unit 217, as part of a digital distributed antenna system (DAS). The DRU 222 is configured to split and distribute the downlink communications signals 220D to different types of remote units, including a low-power remote unit (LPR) 224, a radio antenna unit (dRAU) 226, a mid-power remote unit (dMRU) 228, and a high-power remote unit (dHRU) 230. The DRU 222 is also configured to combine uplink communications signals 220U received from the LPR 224, the dRAU 226, the dMRU 228, and the dHRU 230 and provide the combined uplink communications signals to the digital BBU 218. The digital BBU 218 is also configured to interface with a third-party central unit 232 and/or an analog source 234 through a radio frequency (RF)/digital converter 236.

The DRU 222 may be coupled to the LPR 224, the dRAU 226, the dMRU 228, and the dHRU 230 via an optical fiber-based communications medium 238. In this regard, the DRU 222 can include a respective electrical-to-optical (E/O) converter 240 and a respective optical-to-electrical (O/E) converter 242. Likewise, each of the LPR 224, the dRAU 226, the dMRU 228, and the dHRU 230 can include a respective E/O converter 244 and a respective O/E converter 246.

The E/O converter 240 at the DRU 222 is configured to convert the downlink communications signals 220D into downlink optical communications signals 248D for distribution to the LPR 224, the dRAU 226, the dMRU 228, and the dHRU 230 via the optical fiber-based communications medium 238. The O/E converter 246 at each of the LPR 224, the dRAU 226, the dMRU 228, and the dHRU 230 is configured to convert the downlink optical communications signals 248D back to the downlink communications signals 220D. The E/O converter 244 at each of the LPR 224, the dRAU 226, the dMRU 228, and the dHRU 230 is configured to convert the uplink communications signals 220U into uplink optical communications signals 248U. The O/E converter 242 at the DRU 222 is configured to convert the uplink optical communications signals 248U back to the uplink communications signals 220U.

In an embodiment, the services node 208 can serve a signal source that generates the downlink communications signals 220D and receives the uplink communications signals 220U. The LPR 224, the dRAU 226, the dMRU 228, and the dHRU 230, which can be collectively referred to as remote units 250, are each coupled to the services node 208 based on non-cooperative connectivity. Herein, non-cooperative connectivity means that the LPR 224, the dRAU 226, the dMRU 228, and the dHRU 230 are not time-synchronized with the services node 208 and do not receive any control signaling and/or real time trigger from the services node 208.

The central unit 217 may be coupled to the remote units 250 via a transport medium unit(s) (TMU) 252 as part of the optical fiber-based communications medium 238 to perform signal aggregation, summation, and distribution. In this regard, the downlink communications signals 220D and/or the uplink communications signals 220U are sampled in the form of digital samples characterized by sampling frequency and sampling bit width (a.k.a. number of bits per sample). Given that the downlink communications signals 220D and/or the uplink communications signals 220U can be related to multiple mobile service providers and communicated in multiple signal channels, the TMU 252 may become a bottleneck that can hinder the ability of the WCS 200 to handle an increasing demand for higher data throughput. As such, it is often necessary to compress the downlink communications signals 220D and/or the uplink communications signals 220U to help ease the throughput demand and cost pressure on the TMU 252.

In this regard, the WCS 200 can be configured according to embodiments disclosed in the present disclosure to concurrently perform signal compression and noise shaping on the downlink communications signals 220D and/or the uplink communications signals 220U. Specifically, the central unit 217 can be configured to compress the downlink communications signals 220D, and the remote units 250 can be configured to compress the uplink communications signals 220U. In an embodiment, the central unit 217 and the remote units 250 can be configured to compress the downlink communications signals 220D and/or the uplink communications signals 220U, respectively, based on any block scaling compression algorithm (e.g., block scaling, block floating point, block scaling with mu-law quantization, etc.). Understandably, by compressing the downlink communications signals 220D and/or the uplink communications signals 220U, it is possible to mitigate the throughput bottleneck caused by the TMU 252, thus helping to avoid or reduce upgrading cost of the TMU 252.

Figure 3:
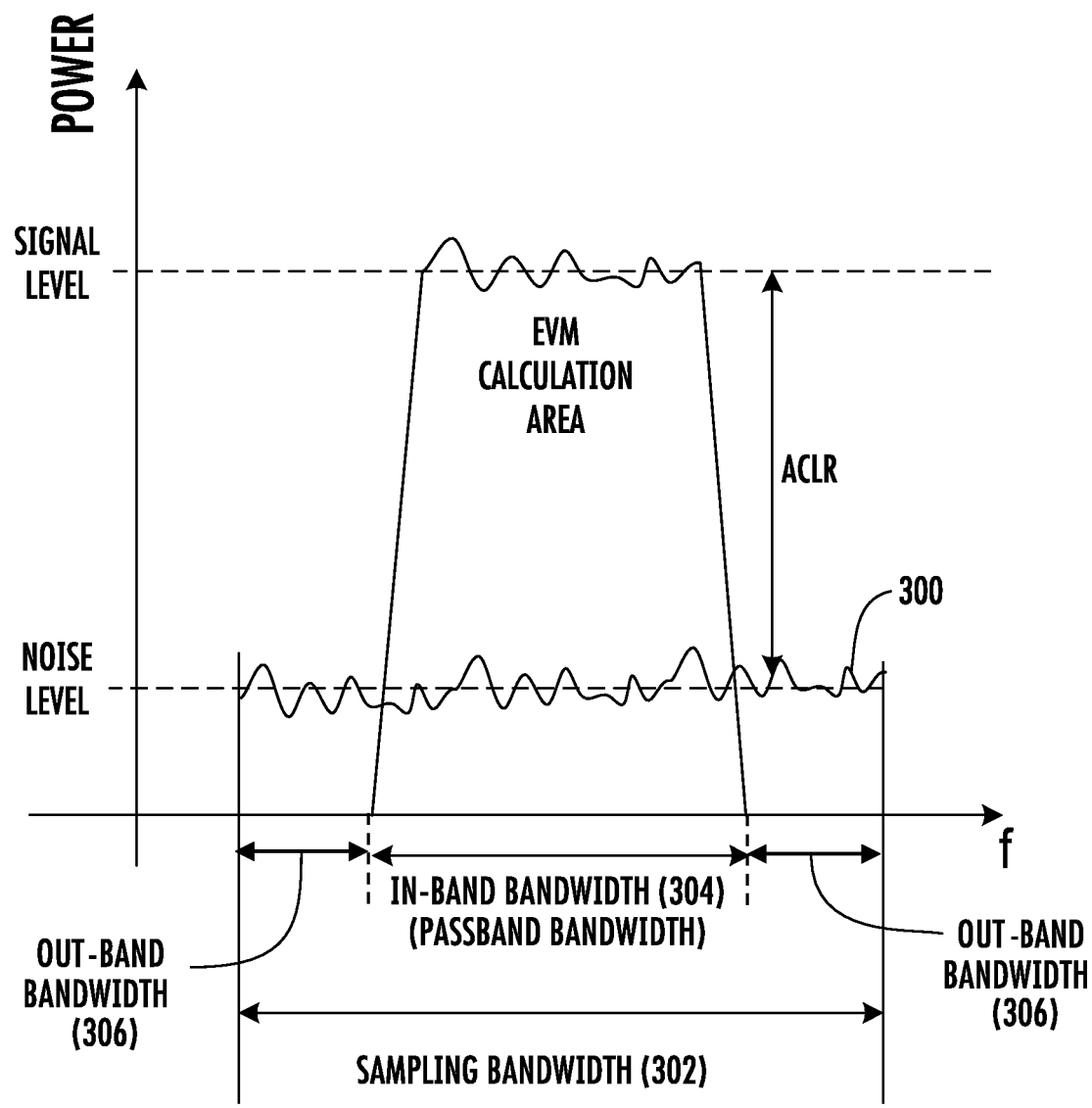
FIG. 3 is a graphic diagram providing an exemplary illustration of a compression noise caused by block scaling compression and distributed across a sampling bandwidth.

However, as illustrated in FIG. 3, the block scaling compression algorithm can typically produce a frequency flat quantization error (a.k.a. compression noise) in an entire sampling bandwidth, which may not be desirable from a practical point of view. FIG. 3 is a graphic diagram providing an exemplary illustration of a compression noise 300 caused by block scaling compression and distributed across a sampling bandwidth 302.

The downlink communications signals 220D and/or the uplink communications signals 220U in FIG. 2 are typically sampled at the sampling bandwidth 302 that is wider than an in-band bandwidth 304 (a.k.a. passband bandwidth) of the downlink communications signals 220D and/or the uplink communications signals 220U. For example, the sampling bandwidth and the in-band bandwidth as specified by common public radio interface (CPRI) standard are 7.68 MHz and 5 MHz, respectively. In this regard, the difference between the sampling bandwidth 302 and the in-band bandwidth 304 can be referred to as an out-band bandwidth 306.

Figure 1:
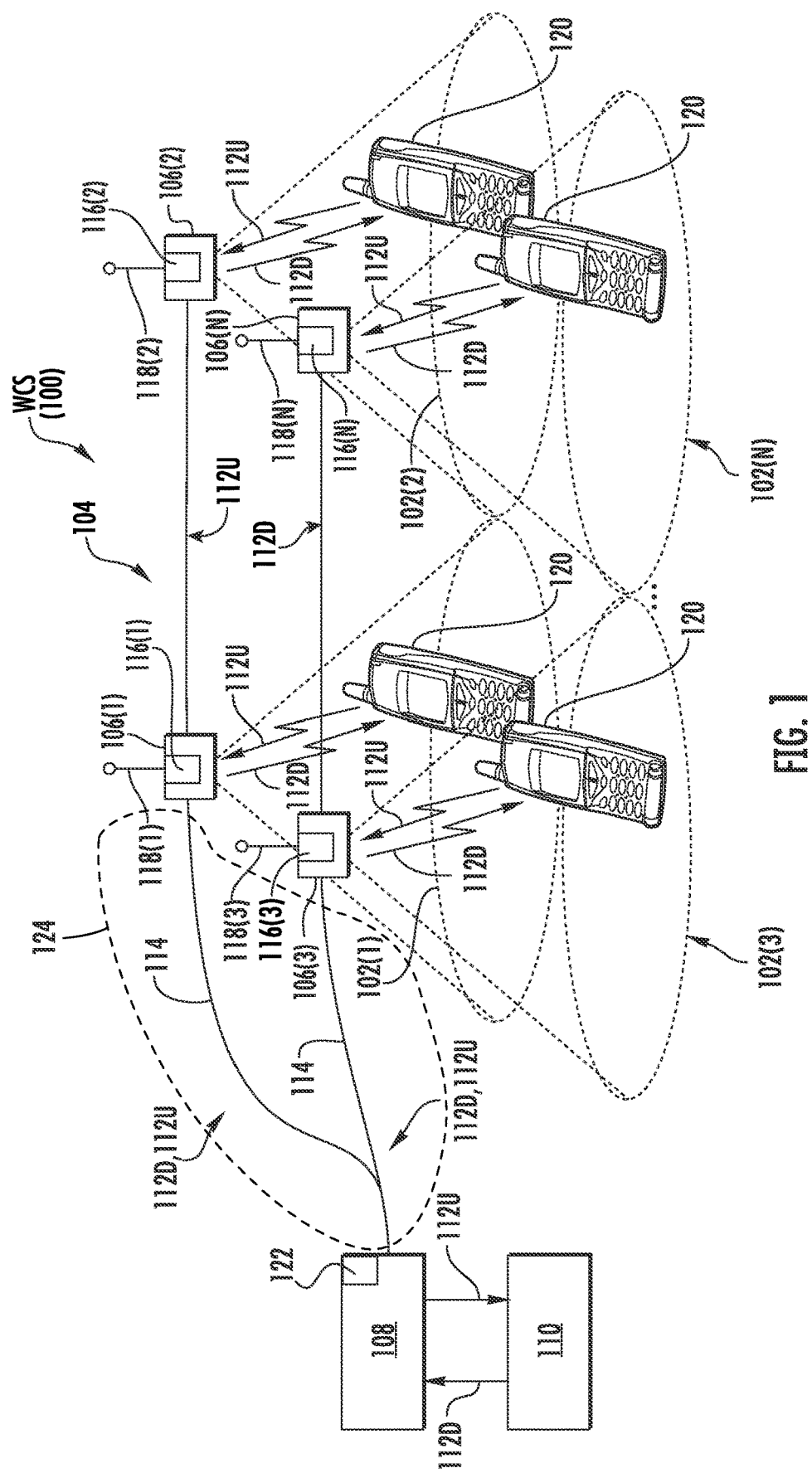
FIG. 1 is a schematic diagram of an exemplary wireless communications system (WCS), such as a distributed communications system (DCS), configured to distribute communications services to remote coverage areas.

According to earlier discussions in FIG. 1, the WCS 200 is required to satisfy both error vector magnitude (EVM) requirements in the in-band bandwidth 304 and adjacent channel leakage ratio (ACLR) requirements in the out-band bandwidth 306. However, as shown in FIG. 3, the compression noise 300 caused by block scaling compression is distributed across both the in-band bandwidth 304 and the out-band bandwidth 306. If the compression noise 300 is not adequately suppressed, the compression noise 300 may negatively impact the EVM in the in-band bandwidth 304 and the ACLR in the out-band bandwidth 306. Thus, it is desirable to effectively compress the downlink communications signals 220D and/or the uplink communications signals 220U without negatively impacting EVM and ACLR performance.

With reference back to FIG. 2, to help improve the EVM and the ACLR, the central unit 217 and the remote units 250 are further configured to perform noise shaping concurrent to performing block scaling compression. In an embodiment, the central unit 217 can perform noise shaping on the downlink communications signals 220D based on whether the remote units 250 are equipped with out-band noise filtering capability to effectively suppress the compression noise 300 in the out-band bandwidth 306. More specifically, the central unit 217 can redistribute the compression noise 300 across the out-band bandwidth 306 if the remote units 250 are equipped with out-band noise filtering capability. Alternatively, the central unit 217 can redistribute the compression noise 300 across the in-band bandwidth 304 if the remote units 250 are not equipped with out-band noise filtering capability. The remote units 250, on the other hand, can always assume that the central unit 217 has the out-band noise filtering capability. Accordingly, the remote units 250 can perform noise shaping on the uplink communications signals 220U to redistribute the compression noise 300 across the in-band bandwidth 304. By performing noise shaping concurrent to signal compression, it is possible to achieve a good trade-off between compression ratio and latency, without compromising such quality metrics as EVM and ACLR, thus helping to improve throughput and performance of the WCS 200.

Figure 4:
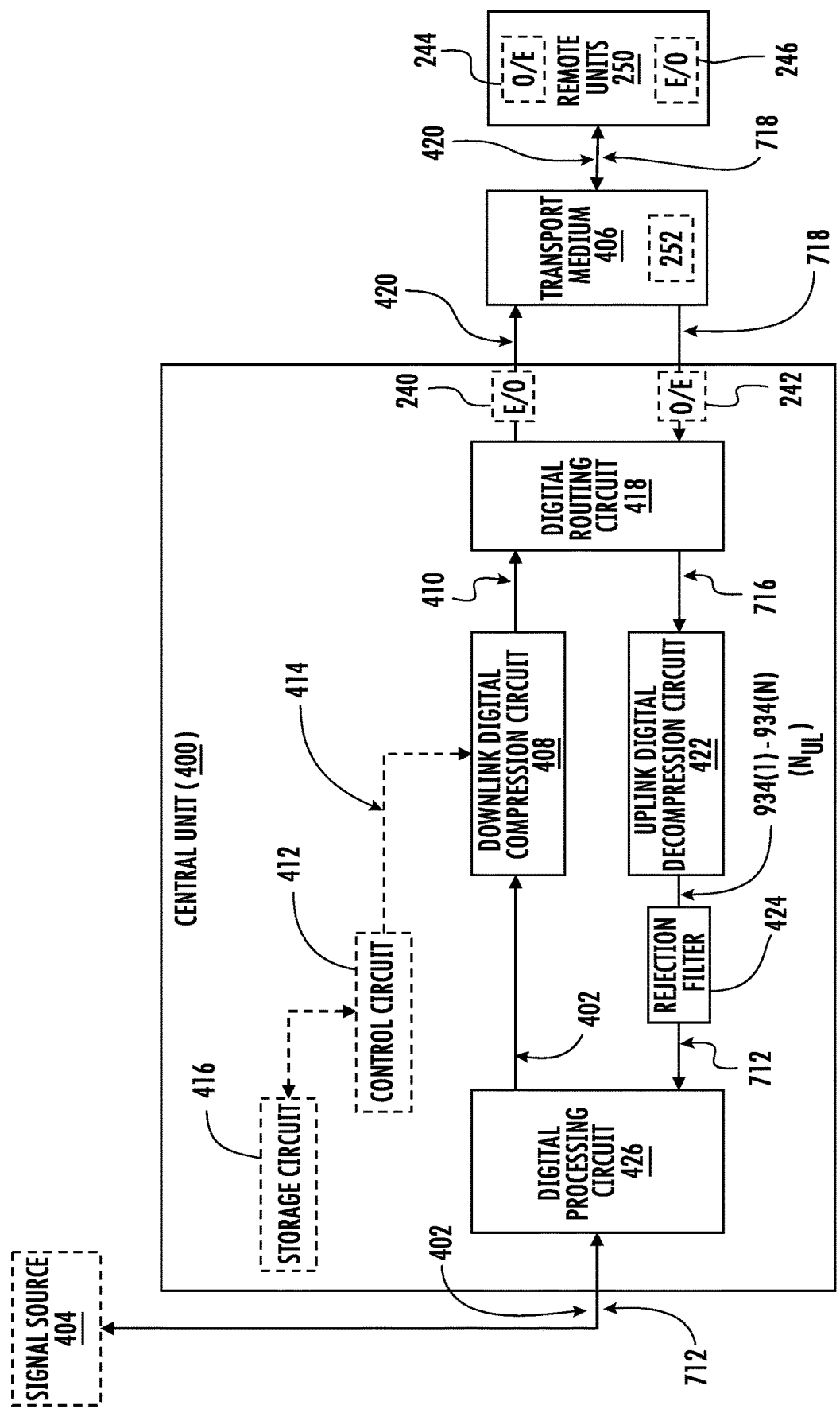
FIG. 4 is a schematic diagram of an exemplary central unit, which can be provided in the WCS of FIG. 2, to perform compression and noise shaping on at least one downlink digital communications signal.

FIG. 4 is a schematic diagram of an exemplary central unit 400, which can be provided in the WCS 200 of FIG. 2, to perform compression and noise shaping on at least one downlink digital communications signal 402. Common elements between FIGS. 2 and 4 are shown therein with common element numbers and will not be re-described herein.

In a non-limiting example, the central unit 400 can replace or be functionally equivalent to the central unit 217 in the WCS 200. In this regard, the central unit 400 may be coupled between a signal source 404 (e.g., mobile service provider) and a transport medium 406. The transport medium 406, which may include the TMU 252, is further coupled to the remote units 250.

The central unit 400 includes a downlink digital compression circuit 408. The downlink digital compression circuit 408 is configured to perform compression and noise shaping on the downlink digital communications signal 402 to thereby generate at least one compressed downlink digital communications signal 410. A specific embodiment of the downlink digital compression circuit 408 is further illustrated in FIG. 5.

Figure 5:
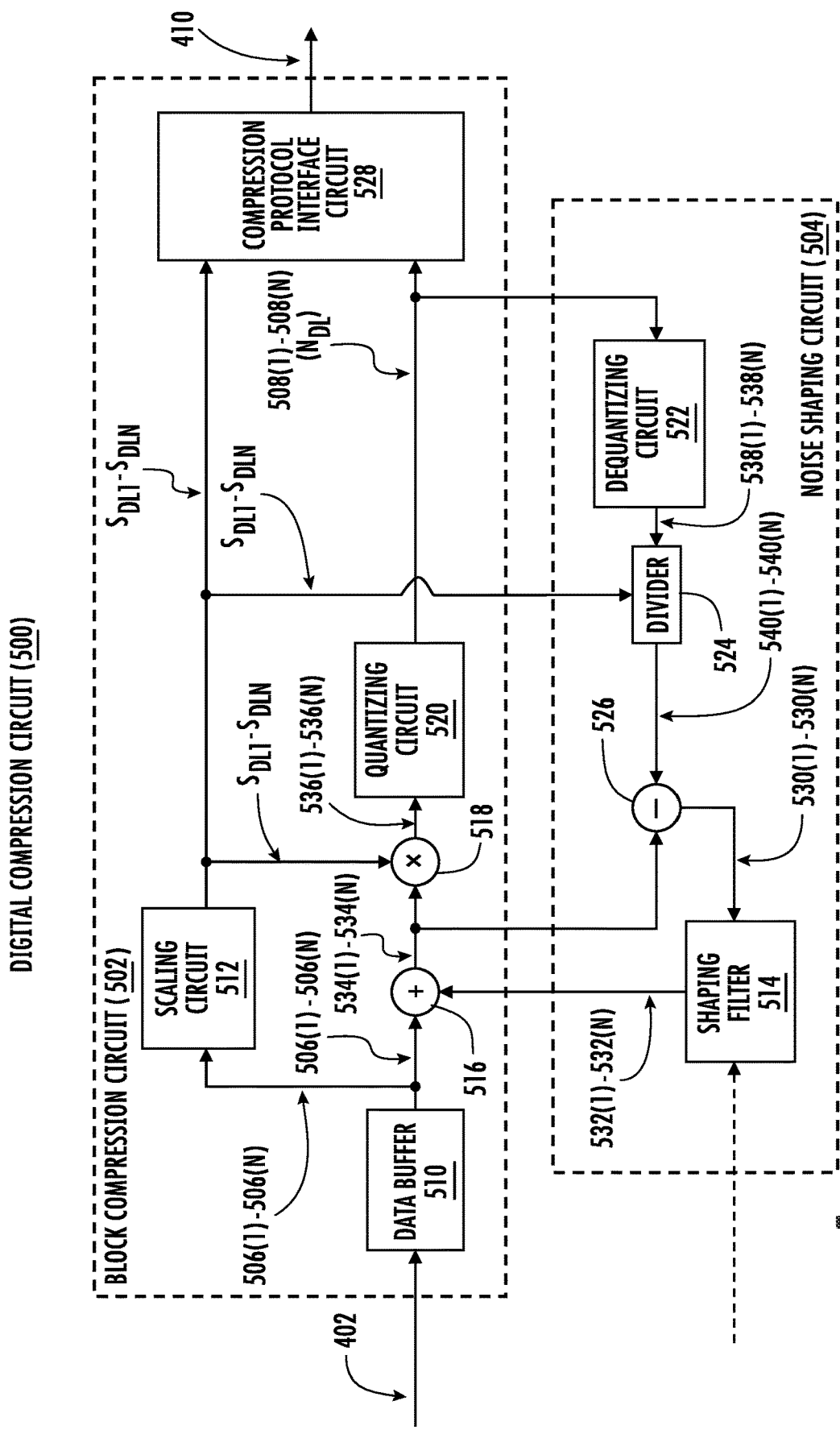
FIG. 5 is a schematic diagram of an exemplary digital compression circuit, which can be provided in the central unit of FIG. 4 to function as a downlink digital compression circuit to perform compression and noise shaping on the downlink digital communications signal.

FIG. 5 is a schematic diagram of an exemplary digital compression circuit 500, which can be provided in the central unit 400 of FIG. 4 to function as the downlink digital compression circuit 408. Common elements between FIGS. 4 and 5 are shown therein with common element numbers and will not be re-described herein.

In an embodiment, the digital compression circuit 500 includes a block compression circuit 502 (a.k.a. "downlink block compression circuit") and a noise shaping circuit 504 (a.k.a. "downlink noise shaping circuit"). Notably, the block compression circuit 502 and the noise shaping circuit 504 are illustrated as separate circuits merely for the convenience of reference. It should be appreciated that the block compression circuit 502 and the noise shaping circuit 504 are in fact integrated into the digital compression circuit 500 without any physical boundary and/or separation.

The block compression circuit 502 is configured to receive the downlink digital communications signal 402, which is sampled based on a downlink sampling bandwidth, as shown in FIG. 3 as the sampling bandwidth 302. As discussed in FIG. 3, the downlink sampling bandwidth includes a downlink in-band bandwidth (shown in FIG. 3 as the in-band bandwidth 304) and a downlink out-band bandwidth (as shown in FIG. 3 as the out-band bandwidth 306). The block compression circuit 502 is also configured to generate a plurality of downlink sample blocks 506(1)-506(N) based on the downlink digital communications signal 402. Accordingly, the block compression circuit 502 compresses each of the downlink sample blocks 506(1)-506(N) based on a respective one of a plurality of downlink scaling factors $S_{DL1}$-$S_{DLN}$ to generate a respective one of a plurality of compressed downlink sample blocks 508(1)-508(N). Understandably from FIG. 3, the block compression performed by the block compression circuit 502 can cause a downlink compression noise $N_{DL}$ across the downlink sampling bandwidth (e.g., the sampling bandwidth 302 in FIG. 3) of each of the compressed downlink sample blocks 508(1)-508(N). The noise shaping circuit 504 is configured to cause the downlink compression noise $N_{DL}$ associated with each of the compressed downlink sample blocks 508(1)-508(N) to be redistributed across a selected one of the downlink in-band bandwidth (e.g., the in-band bandwidth 304 in FIG. 3) and the downlink out-band bandwidth (e.g., the out-band bandwidth 306 in FIG. 3).

In an embodiment, the digital compression circuit 500 includes a data buffer 510, a scaling circuit 512, a shaping filter 514, a combiner 516, a multiplier 518, a quantizing circuit 520, a dequantizing circuit 522, a divider 524, a subtractor 526, and a compression protocol interface circuit 528. The data buffer 510 is configured to generate the downlink sample blocks 506(1)-506(N) from the downlink digital communications signal 402. The scaling circuit 512 is configured to determine a respective one of the downlink scaling factors $S_{DL1}$-$S_{DLN}$ for each of the downlink sample blocks 506(1)-506(N).

The shaping filter 514 is configured to receive a respective one of a plurality of downlink quantization error samples 530(1)-530(N) associated with each of the compressed downlink sample blocks 508(1)-508(N). Accordingly, the shaping filter 514 generates a respective one of a plurality of downlink noise samples 532(1)-532(N) based on each of the downlink quantization error samples 530(1)-530(N). In a non-limiting example, the shaping filter 514 can be a finite impulse response (FIR) or an infinite impulse response (IIR) filter. In this regard, a coefficient of the shaping filter 514 can be calculated statically or dynamically (e.g., adaptive filtering) with one of known filter design methods, such as an effective filter vector h'=[1 h], and can have a desired frequency response. Notably, the effective filter vector h' should be a minimal-phase filter that does not introduce additional sampling latency.

The combiner 516 is configured to combine samples of each of the downlink sample blocks 506(1)-506(N) with a respective one of the downlink noise samples 532(1)-532(N) to generate a respective one of a plurality of noise-added downlink sample blocks 534(1)-534(N) to thereby cause the downlink compression noise $N_{DL}$ associated with each of the compressed downlink sample blocks 508(1)-508(N) to be redistributed to either the downlink in-band bandwidth 304 or the downlink out-band bandwidth 306.

The multiplier 518 is configured to multiply each of the noise-added downlink sample blocks 534(1)-534(N) with a respective one of the downlink scaling factors $S_{DL1}$-$S_{DLN}$ to generate a respective one of a plurality of scaled noise-added downlink sample blocks 536(1)-536(N). The quantizing circuit 520 is configured to compress each of the scaled noise-added downlink sample blocks 536(1)-536(N) to generate a respective one of the compressed downlink sample blocks 508(1)-508(N).

The dequantizing circuit 522 is configured to decompress each of the compressed downlink sample blocks 508(1)-508(N) to generate a respective one of a plurality of scaled noise-added downlink sample feedbacks 538(1)-538(N). The divider 524 is configured to divide each of the scaled noise-added downlink sample feedbacks 538(1)-538(N) by a respective one of the downlink scaling factors $S_{DL1}$-$S_{DLN}$ to generate a respective one of a plurality of noise-added downlink sample feedbacks 540(1)-540(N). The subtractor 526 is configured to subtract each of the noise-added downlink sample feedbacks 540(1)-540(N) by a respective one of the noise-added downlink sample blocks 534(1)-534(N) to generate a respective one of the downlink quantization error samples 530(1)-530(N). Accordingly, the divider 524 provides the downlink quantization error samples 530(1)-530(N) to the shaping filter 514.

The compression protocol interface circuit 528 is configured to generate the compressed downlink digital communications signal 410 based on the compressed downlink sample blocks 508(1)-508(N) and the downlink scaling factors $S_{DL1}$-$S_{DLN}$. In an embodiment, the compressed downlink digital communications signal 410 includes a plurality of downlink protocol data units (PDUs), such as CPRI PDUs. Each of the downlink PDUs includes a respective one of the compressed downlink sample blocks 508(1)-508(N) and a respective one of the downlink scaling factors $S_{DL1}$-$S_{DLN}$. For example, each of the PDUs can include a first number of bits for carrying the respective one of the compressed downlink sample blocks 508(1)-508(N) and a second number of bits for carrying the respective one of the downlink scaling factors $S_{DL1}$-$S_{DLN}$. As discussed later, the respective one of the downlink scaling factors $S_{DL1}$-$S_{DLN}$ in each of the downlink PDUs can be used to decompress the respective one of the compressed downlink sample blocks 508(1)-508(N).

By employing the digital compression circuit 500 as the downlink digital compression circuit 408, the central unit 400 of FIG. 4 can be configured to perform signal compression and noise shaping for the downlink digital communications signal 402 based on a process. In this regard, FIG. 6 is a flowchart of an exemplary process 600 for supporting signal compression and noise shaping in the WCS 200 of FIG. 2.

According to the process 600, the downlink digital compression circuit 408 is configured to receive the downlink digital communications signal 402 sampled based on the downlink sampling bandwidth 302 that includes the downlink in-band bandwidth 304 and the downlink out-band bandwidth 306 (block 602). The downlink digital compression circuit 408 is also configured to generate the downlink sample blocks 506(1)-506(N) based on the downlink digital communications signal 402 (block 604). The downlink digital compression circuit 408 is configured to compress each of the downlink sample blocks 506(1)-506(N) based on a respective one of the downlink scaling factors $S_{DL1}$-$S_{DLN}$ to generate a respective one of the compressed downlink sample blocks 508(1)-508(N) (block 606). The downlink digital compression circuit 408 is also configured to cause the downlink compression noise $N_{DL}$ associated with each of the compressed downlink sample blocks 508(1)-508(N) to be redistributed across the selected one of the downlink in-band bandwidth 304 and the downlink out-band bandwidth 306 (block 608).

With reference back to FIG. 4, in an embodiment, the central unit 400 includes a control circuit 412, which can be a field-programmable gate array (FPGA), as an example. The control circuit 412 may be configured to determine whether to redistribute the downlink compression noise $N_{DL}$ to the downlink in-band bandwidth 304 or the downlink out-band bandwidth 306 based on the out-band noise filtering capability of a respective one or more of the remote units 250 and provides an indication 414 to the downlink digital compression circuit 408. If the indication 414 indicates that the respective one or more of the remote units 250 do not have the out-band noise filtering capability, the downlink digital compression circuit 408 may operate to redistribute the downlink compression noise $N_{DL}$ in each of the compressed downlink sample blocks 508(1)-508(N) to the downlink in-band bandwidth 304. In contrast, if the indication 414 indicates that the respective one or more of the remote units 250 do have the out-band noise filtering capability, the downlink digital compression circuit 408 may operate to redistribute the downlink compression noise $N_{DL}$ in each of the compressed downlink sample blocks 508(1)-508(N) to the downlink out-band bandwidth 306.

The central unit 400 may further include a storage circuit 416, which can be a flash storage device or a register bank, as an example. The storage circuit 416 may be configured to store an out-band filter configuration for each of the remote units 250. In this regard, the control circuit 412 may determine the out-band noise filtering capability of the respective one or more of the remote units 250 based on the stored out-band filter configuration.

The central unit 400 further includes a digital routing circuit 418 that couples the downlink digital compression circuit 408 with the transport medium 406. In a non-limiting example, the transport medium 406 can be an optical fiber-based transport medium. In this regard, the central unit 400 can include the E/O converter 240 to convert the compressed downlink digital communications signal 410 into a compressed downlink optical communications signal 420 for distribution to the remote units 250. The remote units 250 may each include the respective O/E converter 244 to convert the compressed downlink optical communications signal 420 back to the compressed downlink digital communications signal 410.

Figure 7:
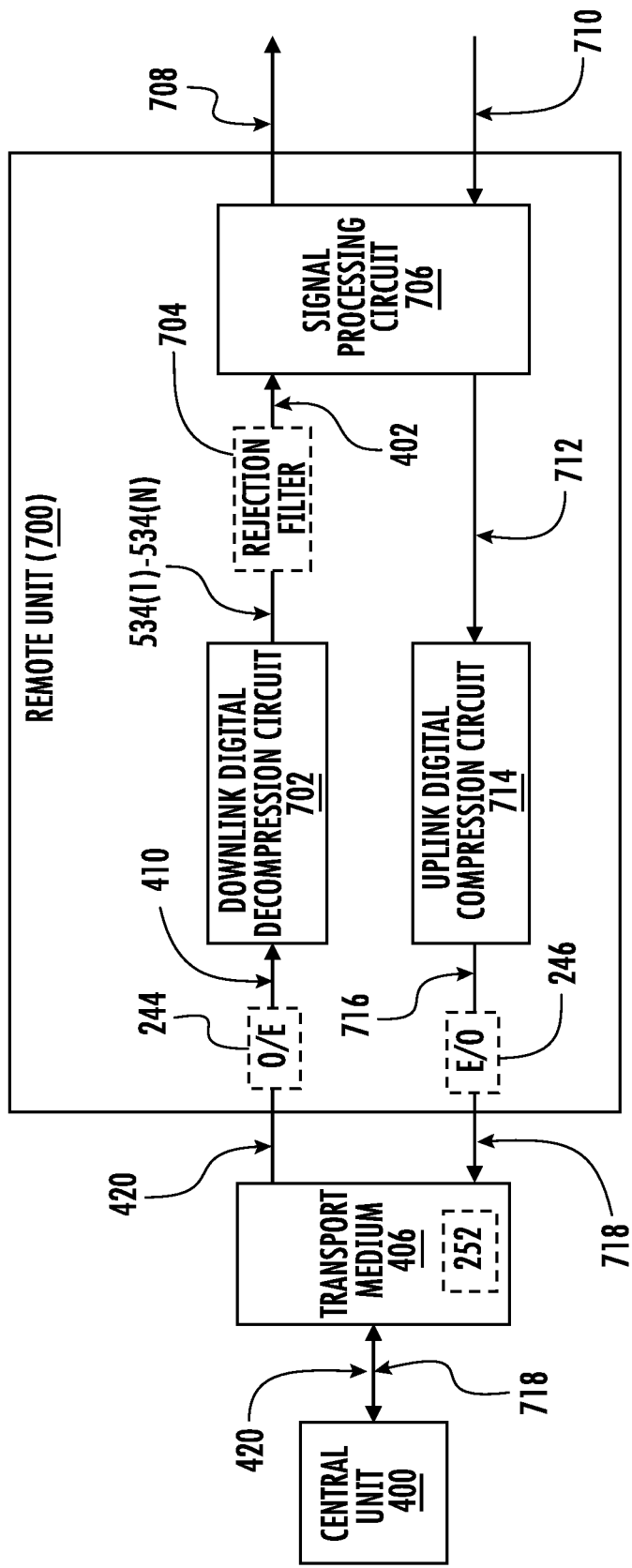
FIG. 7 is a schematic diagram of an exemplary remote unit, which can be coupled to the central unit of FIG. 4 to perform compression and noise shaping on the at least one uplink digital communications signal.

Each of the remote units 250 is configured to decompress the compressed downlink digital communications signal 410 for transmission in a radio frequency (RF) band. In this regard, FIG. 7 is a schematic diagram of an exemplary remote unit 700, which can be coupled to the central unit 400 of FIG. 4 as any of the remote units 250. Common elements between FIGS. 4, 5, and 7 are shown therein with common element numbers and will not be re-described herein.

Figure 8:
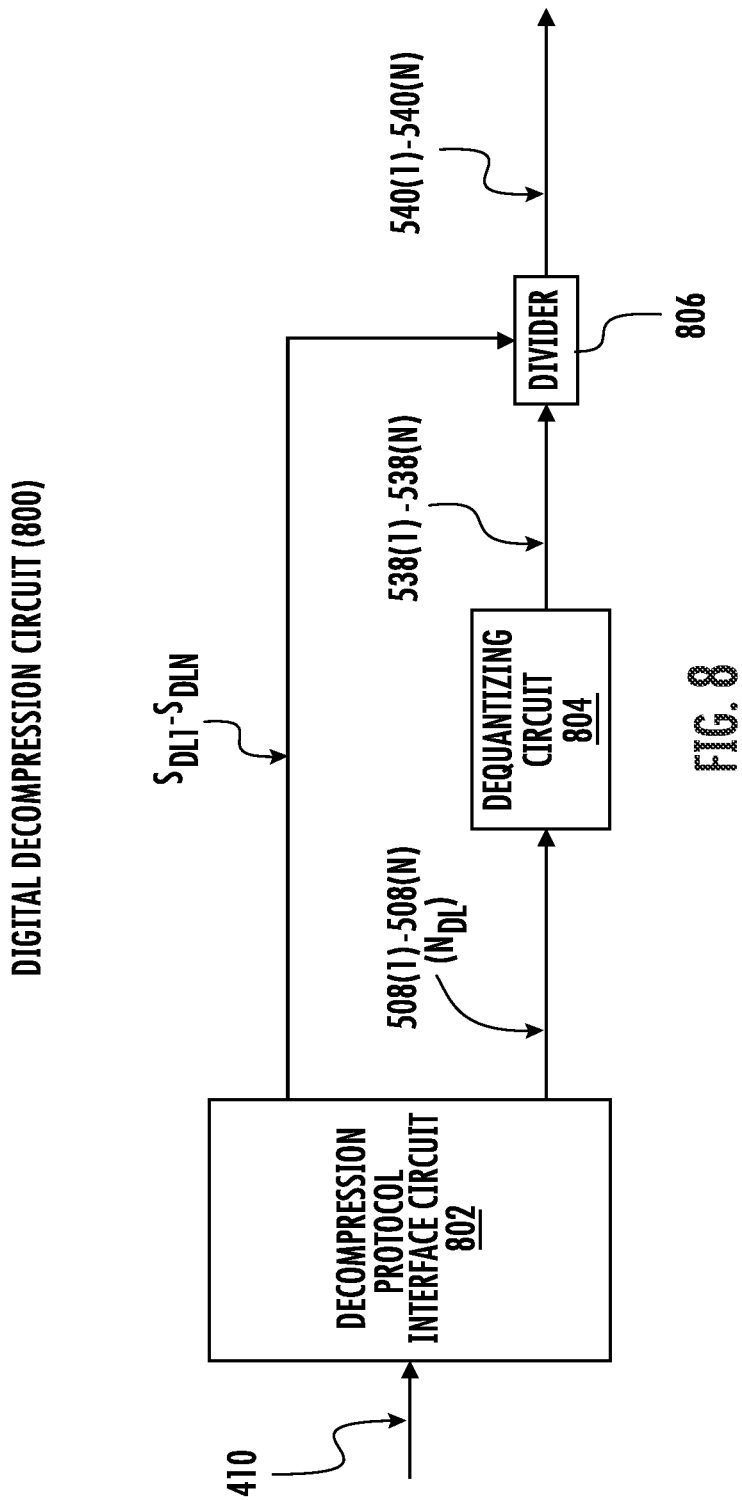
FIG. 8 is a schematic diagram of an exemplary digital decompression circuit, which can be provided in the remote unit in FIG. 7 to function as a downlink digital decompression circuit.

In one aspect, the remote unit 700 is configured to decompress the compressed downlink digital communications signal 410 to recover the downlink digital communications signal 402. In this regard, the remote unit 700 includes a downlink digital decompression circuit 702, as illustrated in FIG. 8. FIG. 8 is a schematic diagram of an exemplary digital decompression circuit 800, which can be provided in the remote unit 700 of FIG. 7 to function as the downlink digital decompression circuit 702. Common elements between FIGS. 4, 5, 7, and 8 are shown therein with common element numbers and will not be re-described herein.

In an embodiment, the digital decompression circuit 800 includes a decompression protocol interface circuit 802, a decompression dequantizing circuit 804, and a decompression divider 806. The decompression protocol interface circuit 802 is configured to extract a respective one of the compressed downlink sample blocks 508(1)-508(N) and a respective one of the downlink scaling factors $S_{DL1}$-$S_{DLN}$ from each of the downlink PDUs received in the compressed downlink digital communications signal 410. The decompression dequantizing circuit 804 is configured to decompress each of the compressed downlink sample blocks 508(1)-508(N) to generate a respective one of the scaled noise-added downlink sample feedbacks 538(1)-538(N). The decompression divider 806 is configured to divide each of the scaled noise-added downlink sample feedbacks 538(1)-538(N) by a respective one of the downlink scaling factors $S_{DL1}$-$S_{DLN}$ to generate a respective one of the noise-added downlink sample feedbacks 540(1)-540(N). As a result of the compression and noise shaping performed by the central unit 400 of FIG. 4, the downlink compression noise $N_{DL}$ has been redistributed across the downlink in-band bandwidth 304 or the downlink out-band bandwidth 306 in each of the noise-added downlink sample feedbacks 540(1)-540(N).

With reference back to FIG. 7, the remote unit 700 may or may not include a rejection filter 704, which defines the out-band noise filtering capability of the remote unit 700. Herein, the remote unit 700 is said to have the out-band noise filtering capability when the rejection filter 704 is present in the remote unit 700. In contrast, the remote unit 700 is said to lack the out-band noise filtering capability when the rejection filter 704 is absent from the remote unit 700. As previously discussed in FIG. 4, the downlink digital compression circuit 408 in the central unit 400 would redistribute the downlink compression noise $N_{DL}$ to the out-band bandwidth 306 when the remote unit 700 is determined to have the out-band noise filtering capability. As such, the rejection filter 704 can be configured to suppress the downlink compression noise $N_{DL}$ associated with each of the scaled noise-added downlink sample feedbacks 538(1)-538(N) in the downlink out-band bandwidth 306 to obtain the downlink digital communications signal 402. Otherwise, the downlink digital communications signal 402 will include the scaled noise-added downlink sample feedbacks 538(1)-538(N) in the downlink in-band bandwidth 304.

The remote unit 700 includes a signal processing circuit 706. The signal processing circuit 706 is configured to convert the downlink digital communications signal 402 into at least one downlink radio frequency (RF) communications signal 708 for transmission over an RF spectrum. The signal processing circuit 706 also receives at least one uplink RF communications signal 710 via the RF spectrum and converts the uplink RF communications signal 710 into at least one uplink digital communications signal 712.

In another aspect, the remote unit 700 is configured perform compression and noise shaping on at least one uplink digital communications signal 712. In this regard, the remote unit 700 also includes an uplink digital compression circuit 714 to perform compression and noise shaping on the uplink digital communications signal 712 to thereby generate at least one compressed uplink digital communications signal 716. The respective E/O converter 246 may convert the compressed uplink digital communications signal 716 into at least one compressed uplink optical communications signal 718 for transmission to the central unit 400 via the transport medium 406.

Figure 9:
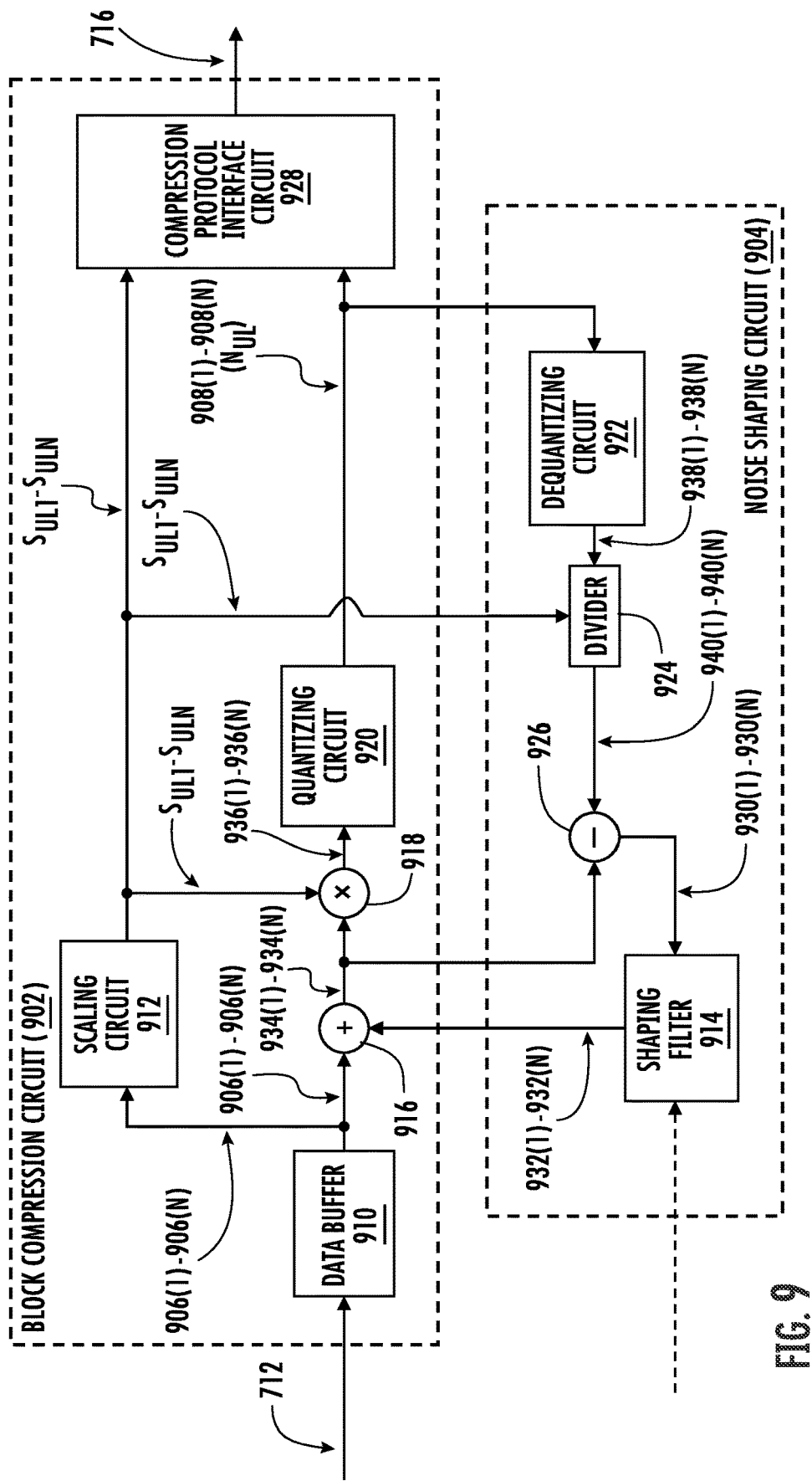
FIG. 9 is a schematic diagram of an exemplary digital compression circuit, which can be provided in the remote unit of FIG. 7 to function as an uplink digital compression circuit to perform compression and noise shaping on the uplink digital communications signal.

The uplink digital compression circuit 714 may be implemented in a similar way as the downlink digital compression circuit 408 in the central unit 400. In this regard, FIG. 9 is a schematic diagram of an exemplary digital compression circuit 900, which can be provided in the remote unit 700 of FIG. 7 to function as the uplink digital compression circuit 714. Common elements between FIGS. 5, 7, and 9 are shown therein with common element numbers and will not be re-described herein.

In an embodiment, the digital compression circuit 900 includes a block compression circuit 902 (a.k.a. "uplink block compression circuit") and a noise shaping circuit 904 (a.k.a. "uplink noise shaping circuit"). Notably, the block compression circuit 902 and the noise shaping circuit 904 are illustrated as separate circuits merely for the convenience of reference. It should be appreciated that the block compression circuit 902 and the noise shaping circuit 904 are in fact integrated into the digital compression circuit 900 without any physical boundary and/or separation.

The block compression circuit 902 is configured to receive the uplink digital communications signal 712, which is sampled based on an uplink sampling bandwidth, as shown in FIG. 3 as the sampling bandwidth 302. As discussed in FIG. 3, the uplink sampling bandwidth includes an uplink in-band bandwidth (shown in FIG. 3 as the in-band bandwidth 304) and an uplink out-band bandwidth (shown in FIG. 3 as the out-band bandwidth 306). The block compression circuit 902 is also configured to generate a plurality of uplink sample blocks 906(1)-906(N) based on the uplink digital communications signal 712. Accordingly, the block compression circuit 902 compresses each of the uplink sample blocks 906(1)-906(N) based on a respective one of a plurality of uplink scaling factors $S_{UL1}$-$S_{ULN}$ to generate a respective one of a plurality of compressed uplink sample blocks 908(1)-908(N). Understandably from FIG. 3, the block compression performed by the block compression circuit 902 can cause an uplink compression noise $N_{UL}$ across the uplink sampling bandwidth (e.g., the sampling bandwidth 302 in FIG. 3) of each of the compressed uplink sample blocks 908(1)-908(N). It may be assumed that the central unit 400 will always have the out-band noise filtering capability. As such, the noise shaping circuit 904 is configured to cause the uplink compression noise $N_{UL}$ associated with each of the compressed uplink sample blocks 908(1)-908(N) to be redistributed across the uplink out-band bandwidth (e.g., the out-band bandwidth 306 in FIG. 3).

In an embodiment, the digital compression circuit 900 includes a data buffer 910, a scaling circuit 912, a shaping filter 914, a combiner 916, a multiplier 918, a quantizing circuit 920, a dequantizing circuit 922, a divider 924, a subtractor 926, and a compression protocol interface circuit 928. The data buffer 910 is configured to generate the uplink sample blocks 906(1)-906(N) from the uplink digital communications signal 712. The scaling circuit 912 is configured to determine a respective one of the uplink scaling factors $S_{UL1}$-$S_{ULN}$ for each of the uplink sample blocks 906(1)-906(N).

The shaping filter 914 is configured to receive a respective one of a plurality of uplink quantization error samples 930(1)-930(N) associated with each of the compressed uplink sample blocks 908(1)-908(N). Accordingly, the shaping filter 914 generates a respective one of a plurality of uplink noise samples 932(1)-932(N) based on each of the uplink quantization error samples 930(1)-930(N). In a non-limiting example, the shaping filter 914 can be a finite impulse response (FIR) or an infinite impulse response (IIR) filter. In this regard, a coefficient of the shaping filter 914 can be calculated statically or dynamically (e.g., adaptive filtering) with one of the known filter design methods, such as an effective filter vector h'=[1 h], and can have a desired frequency response. Notably, the effective filter vector h' should be a minimal-phase filter that does not introduce additional sampling latency.

The combiner 916 is configured to combine samples of each of the uplink sample blocks 906(1)-906(N) with a respective one of the uplink noise samples 932(1)-932(N) to generate a respective one of a plurality of noise-added uplink sample blocks 934(1)-934(N) to thereby cause the uplink compression noise $N_{UL}$ associated with each of the compressed uplink sample blocks 908(1)-908(N) to be redistributed to the uplink out-band bandwidth 306.

The multiplier 918 is configured to multiply each of the noise-added uplink sample blocks 934(1)-934(N) with a respective one of the uplink scaling factors $S_{UL1}$-$S_{ULN}$ to generate a respective one of a plurality of scaled noise-added uplink sample blocks 936(1)-936(N). The quantizing circuit 920 is configured to compress each of the scaled noise-added uplink sample blocks 936(1)-936(N) to generate a respective one of the compressed uplink sample blocks 908(1)-908(N).

The dequantizing circuit 922 is configured to decompress each of the compressed uplink sample blocks 908(1)-908(N) to generate a respective one of a plurality of scaled noise-added uplink sample feedbacks 938(1)-938(N). The divider 924 is configured to divide each of the scaled noise-added uplink sample feedbacks 938(1)-938(N) by a respective one of the uplink scaling factors $S_{UL1}$-$S_{ULN}$ to generate a respective one of a plurality of noise-added uplink sample feedbacks 940(1)-940(N). The subtractor 926 is configured to subtract each of the noise-added uplink sample feedbacks 940(1)-940(N) by a respective one of the noise-added uplink sample blocks 934(1)-934(N) to generate a respective one of the uplink quantization error samples 930(1)-930(N). Accordingly, the subtractor 926 provides the uplink quantization error samples 930(1)-930(N) to the shaping filter 914.

The compression protocol interface circuit 928 is configured to generate the compressed uplink digital communications signal 716 based on the compressed uplink sample blocks 908(1)-908(N) and the uplink scaling factors $S_{UL1}$-$S_{ULN}$. In an embodiment, the compressed uplink digital communications signal 716 includes a plurality of uplink protocol data units (PDUs), such as CPRI PDUs. Each of the uplink PDUs includes a respective one of the compressed uplink sample blocks 908(1)-908(N) and a respective one of the uplink scaling factors $S_{UL1}$-$S_{ULN}$. For example, each of the PDUs can include a first number of bits for carrying the respective one of the compressed uplink sample blocks 908(1)-908(N) and a second number of bits for carrying the respective one of the uplink scaling factors $S_{UL1}$-$S_{ULN}$. As discussed later, the respective one of the uplink scaling factors $S_{DL1}$-$S_{DLN}$ in each of the uplink PDUs can be used to decompress the respective one of the compressed uplink sample blocks 908(1)-908(N).

With reference back to FIG. 4, the central unit 400 receives the compressed uplink optical communications signal 718 via the transport medium 406. Accordingly, the O/E converter 242 in the central unit 400 converts the compressed uplink optical communications signal 718 into the compressed uplink digital communications signal 716. In an embodiment, the central unit 400 further includes an uplink digital decompression circuit 422. The uplink digital decompression circuit 422 is configured to decompress the compressed uplink digital communications signal 716 to recover the uplink digital communications signal 712.

Figure 10:
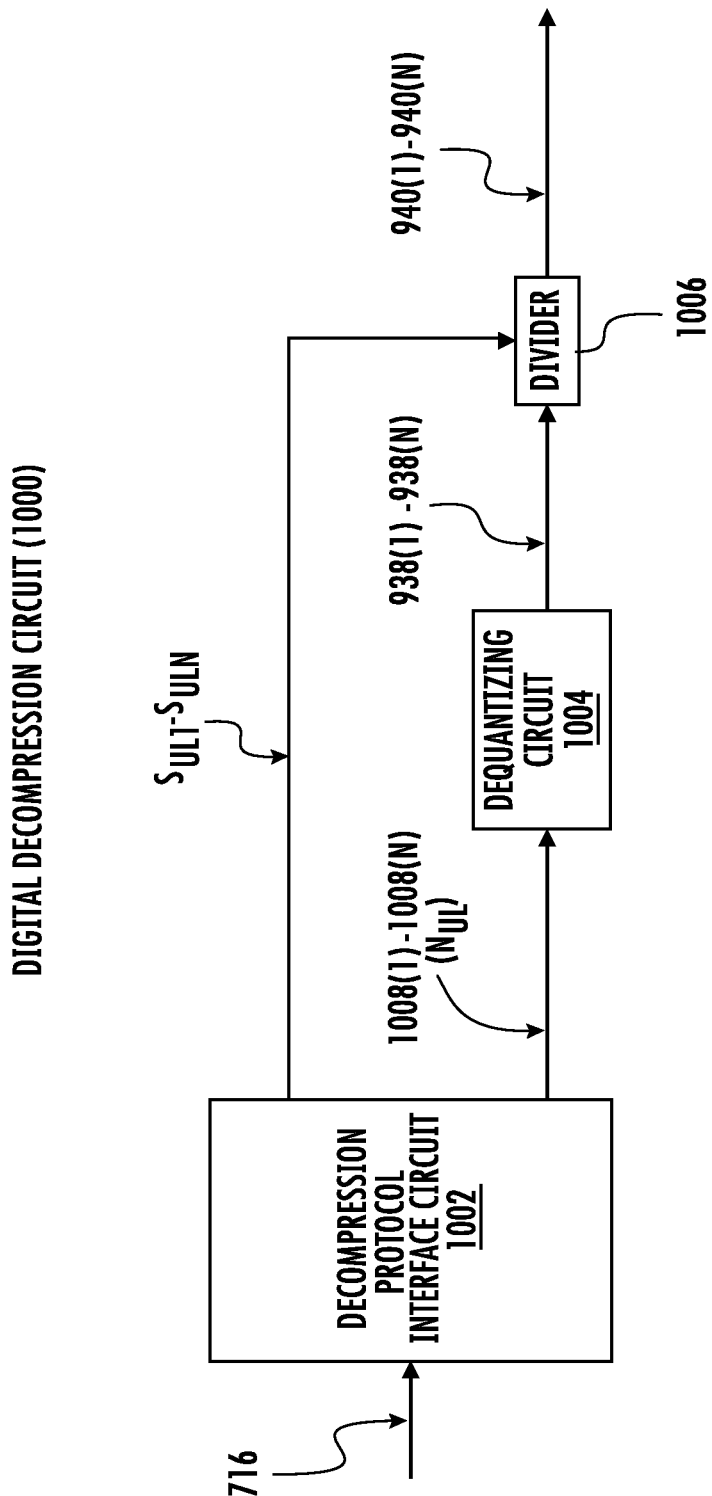
FIG. 10 is a schematic diagram of an exemplary digital decompression circuit, which can be provided in the central unit in FIG. 4 to function as an uplink digital decompression circuit.

The uplink digital decompression circuit 422 may be implemented in a similar way as the uplink digital decompression circuit 714 in the remote unit 700. In this regard, FIG. 10 is a schematic diagram of an exemplary digital decompression circuit 1000, which can be provided in the central unit 400 of FIG. 4 to function as the uplink digital decompression circuit 422. Common elements between FIGS. 4, 9, and 10 are shown therein with common element numbers and will not be re-described herein.

In an embodiment, the digital decompression circuit 1000 includes a decompression protocol interface circuit 1002, a decompression dequantizing circuit 1004, and a decompression divider 1006. The decompression protocol interface circuit 1002 is configured to extract a respective one of the compressed uplink sample blocks 1008(1)-1008(N) and a respective one of the uplink scaling factors $S_{UL1}$-$S_{ULN}$ from each of the uplink PDUs received in the compressed uplink digital communications signal 716. The decompression dequantizing circuit 1004 is configured to decompress each of the compressed uplink sample blocks 1008(1)-1008(N) to generate a respective one of the scaled noise-added uplink sample feedbacks 938(1)-938(N). The decompression divider 1006 is configured to divide each of the scaled noise-added uplink sample feedbacks 938(1)-938(N) by a respective one of the uplink scaling factors $S_{UL1}$-$S_{ULN}$ to generate a respective one of noise-added uplink sample feedbacks 940(1)-940(N). As a result of the compression and noise shaping performed by the remote unit 700 of FIG. 7, the uplink compression noise $N_{UL}$ has been redistributed across the downlink out-band bandwidth 306 in each of the noise-added uplink sample blocks 934(1)-934(N).

With reference back to FIG. 4, the central unit 400 includes a rejection filter circuit 424 to provide the out-band noise rejection capability in the central unit 400. The rejection filter circuit 424 is configured to suppress the uplink compression noise $N_{UL}$ in each of the noise-added uplink sample blocks 934(1)-934(N) to thereby obtain the uplink digital communications signal 712.

The central unit 400 may also include a digital processing circuit 426, which can be functionally equivalent to the digital BBU 218 in FIG. 2. The digital processing circuit 426 is coupled to the signal source 404. The digital processing circuit 426 is configured to receive the downlink digital communications signal 402 from the signal source 404 and provide the uplink digital communications signal 712 to the signal source 404.

Figure 11:
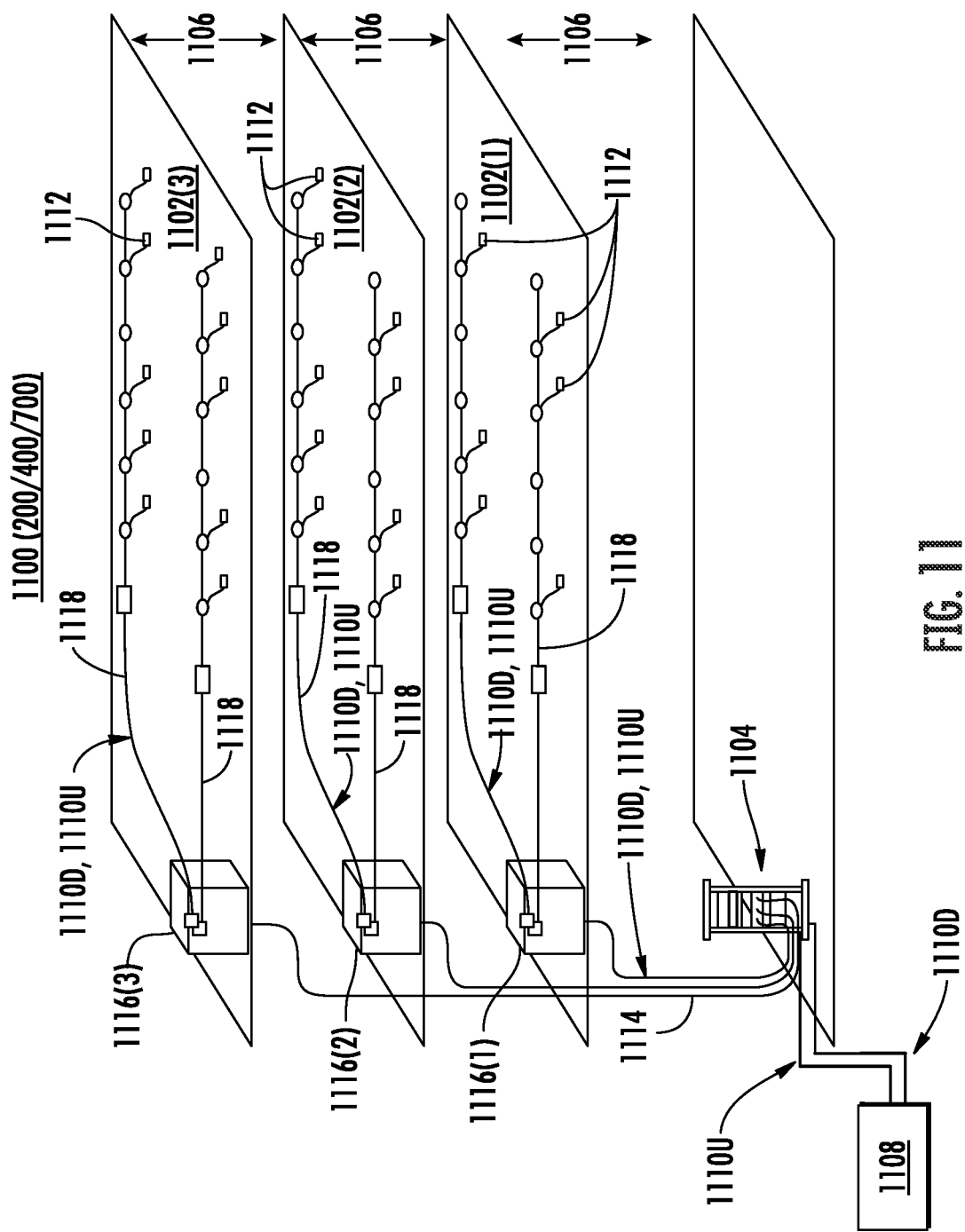
FIG. 11 is a partial schematic cut-away diagram of an exemplary building infrastructure in a WCS, such as the WCS of FIG. 2 that includes the central unit of FIG. 4 and the remote unit of FIG. 7 for supporting downlink and uplink signal compression and noise shaping.

The WCS 200 of FIG. 2, which can include the central unit 400 of FIG. 4 and the remote unit 700 in FIG. 7, can be provided in an indoor environment as illustrated in FIG. 11. FIG. 11 is a partial schematic cut-away diagram of an exemplary building infrastructure 1100 in a WCS, such as the WCS 200 of FIG. 2 that includes the central unit 400 of FIG. 4 and the remote unit 700 of FIG. 7 for supporting downlink and uplink signal compression and noise shaping. The building infrastructure 1100 in this embodiment includes a first (ground) floor 1102(1), a second floor 1102(2), and a third floor 1102(3). The floors 1102(1)-1102(3) are serviced by a central unit 1104 to provide antenna coverage areas 1106 in the building infrastructure 1100. The central unit 1104 is communicatively coupled to a base station 1108 to receive downlink communications signals 1110D from the base station 1108. The central unit 1104 is communicatively coupled to a plurality of remote units 1112 to distribute the downlink communications signals 1110D to the remote units 1112 and to receive uplink communications signals 1110U from the remote units 1112, as previously discussed above. The downlink communications signals 1110D and the uplink communications signals 1110U communicated between the central unit 1104 and the remote units 1112 are carried over a riser cable 1114. The riser cable 1114 may be routed through interconnect units (ICUs) 1116(1)-1116(3) dedicated to each of the floors 1102(1)-1102(3) that route the downlink communications signals 1110D and the uplink communications signals 1110U to the remote units 1112 and also provide power to the remote units 1112 via array cables 1118.

Figure 12:
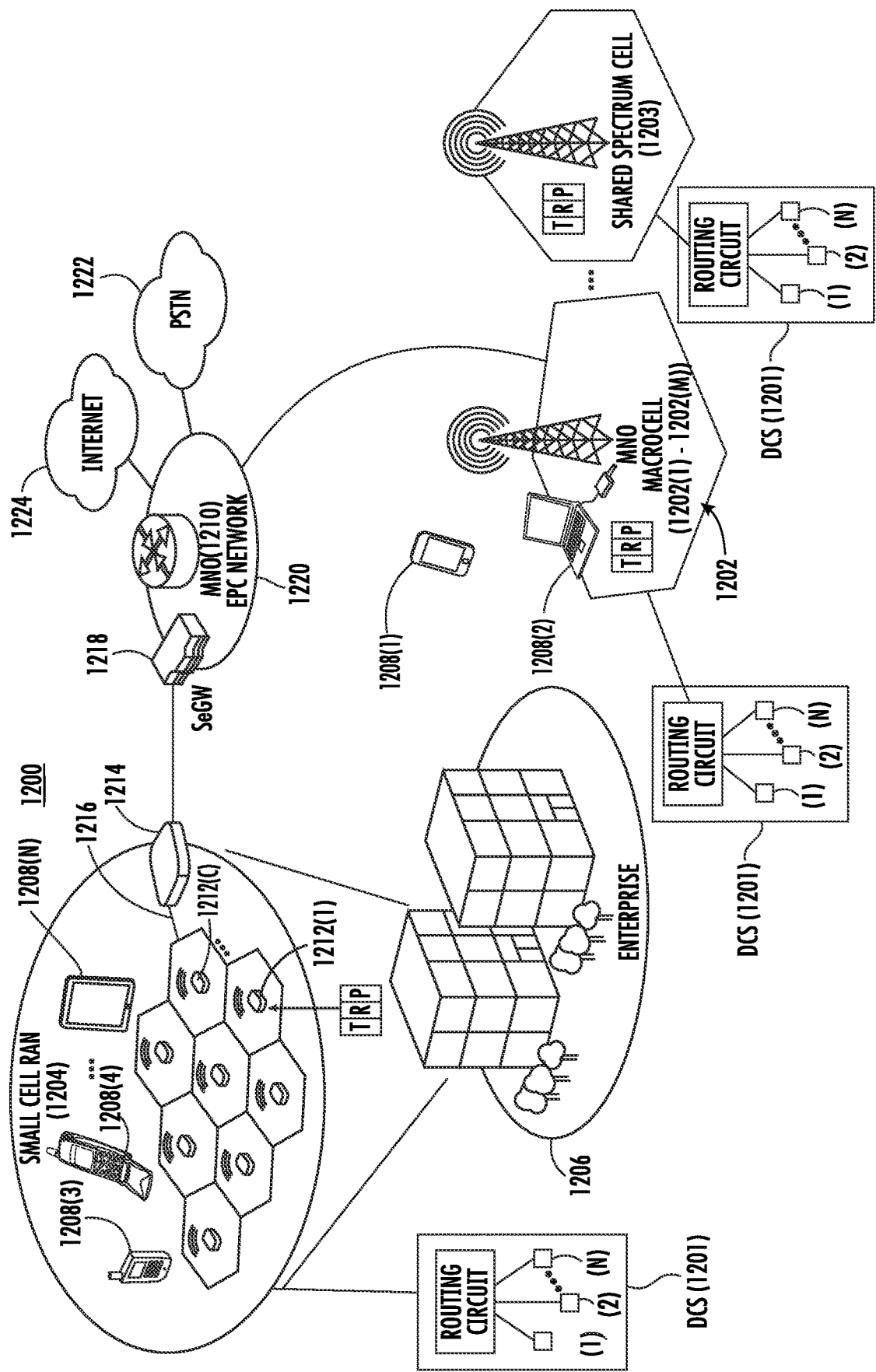
FIG. 12 is a schematic diagram of an exemplary mobile telecommunications environment that can includes the WCS of FIG. 2 that includes the central unit of FIG. 4 and the remote unit of FIG. 7 for supporting downlink and uplink signal compression and noise shaping.

The WCS 200 of FIG. 2, the central unit 400 of FIG. 4, and the remote unit 700 of FIG. 7, configured to support downlink and uplink signal compression and noise shaping, can also be interfaced with different types of radio nodes of service providers and/or supporting service providers, including macrocell systems, small cell systems, and remote radio heads (RRH) systems, as examples. For example, FIG. 12 is a schematic diagram of an exemplary mobile telecommunications environment 1200 (also referred to as "environment 1200") that includes radio nodes and cells that may support shared spectrum, such as unlicensed spectrum, and can be interfaced to shared spectrum WCSs 1201 supporting coordination of distribution of shared spectrum from multiple service providers to remote units to be distributed to subscriber devices. The shared spectrum WCSs 1201 can include the WCS 200 of FIG. 2 that includes the central unit 400 of FIG. 4 and the remote unit 700 of FIG. 7, as an example.

The environment 1200 includes exemplary macrocell RANs 1202(1)-1202(M) ("macrocells 1202(1)-1202(M)") and an exemplary small cell RAN 1204 located within an enterprise environment 1206 and configured to service mobile communications between a user mobile communications device 1208(1)-1208(N) to a mobile network operator (MNO) 1210. A serving RAN for the user mobile communications devices 1208(1)-1208(N) is a RAN or cell in the RAN in which the user mobile communications devices 1208(1)-1208(N) have an established communications session with the exchange of mobile communications signals for mobile communications. Thus, a serving RAN may also be referred to herein as a serving cell. For example, the user mobile communications devices 1208(3)-1208(N) in FIG. 12 are being serviced by the small cell RAN 1204, whereas the user mobile communications devices 1208(1) and 1208(2) are being serviced by the macrocell 1202. The macrocell 1202 is an MNO macrocell in this example. However, a shared spectrum RAN 1203 (also referred to as "shared spectrum cell 1203") includes a macrocell in this example and supports communications on frequencies that are not solely licensed to a particular MNO, such as CBRS for example, and thus may service user mobile communications devices 1208(1)-1208(N) independent of a particular MNO. For example, the shared spectrum cell 1203 may be operated by a third party that is not an MNO and wherein the shared spectrum cell 1203 supports CBRS. Also, as shown in FIG. 12, the MNO macrocell 1202, the shared spectrum cell 1203, and/or the small cell RAN 1204 can interface with a shared spectrum WCS 1201 supporting coordination of distribution of shared spectrum from multiple service providers to remote units to be distributed to subscriber devices. The MNO macrocell 1202, the shared spectrum cell 1203, and the small cell RAN 1204 may be neighboring radio access systems to each other, meaning that some or all can be in proximity to each other such that a user mobile communications device 1208(3)-1208(N) may be able to be in communications range of two or more of the MNO macrocell 1202, the shared spectrum cell 1203, and the small cell RAN 1204 depending on the location of the user mobile communications devices 1208(3)-1208(N).

In FIG. 12, the mobile telecommunications environment 1200 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 12, the small cell RAN 1204 includes one or more services nodes (represented as a single services node 1214) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or local area network (LAN) connection 1216 as an example, typically using secure IPsec tunnels. The small cell radio nodes 1212(1)-1212(C) can include multi-operator radio nodes. The services node 1214 aggregates voice and data traffic from the small cell radio nodes 1212(1)-1212(C) and provides connectivity over an IPsec tunnel to a security gateway (SeGW) 1218 in a network 1220 (e.g., evolved packet core (EPC) network in a 4G network, or 5G Core in a 5G network) of the MNO 1210. The network 1220 is typically configured to communicate with a public switched telephone network (PSTN) 1222 to carry circuit-switched traffic, as well as for communicating with an external packet-switched network such as the Internet 1224.

The environment 1200 also generally includes a node (e.g., eNodeB or gNodeB) base station, or "macrocell" 1202. The radio coverage area of the macrocell 1202 is typically much larger than that of a small cell where the extent of coverage often depends on the base station configuration and surrounding geography. Thus, a given user mobile communications device 1208(3)-1208(N) may achieve connectivity to the network 1220 (e.g., EPC network in a 4G network, or 5G Core in a 5G network) through either a macrocell 1202 or small cell radio node 1212(1)-1212(C) in the small cell RAN 1204 in the environment 1200.

Figure 13:
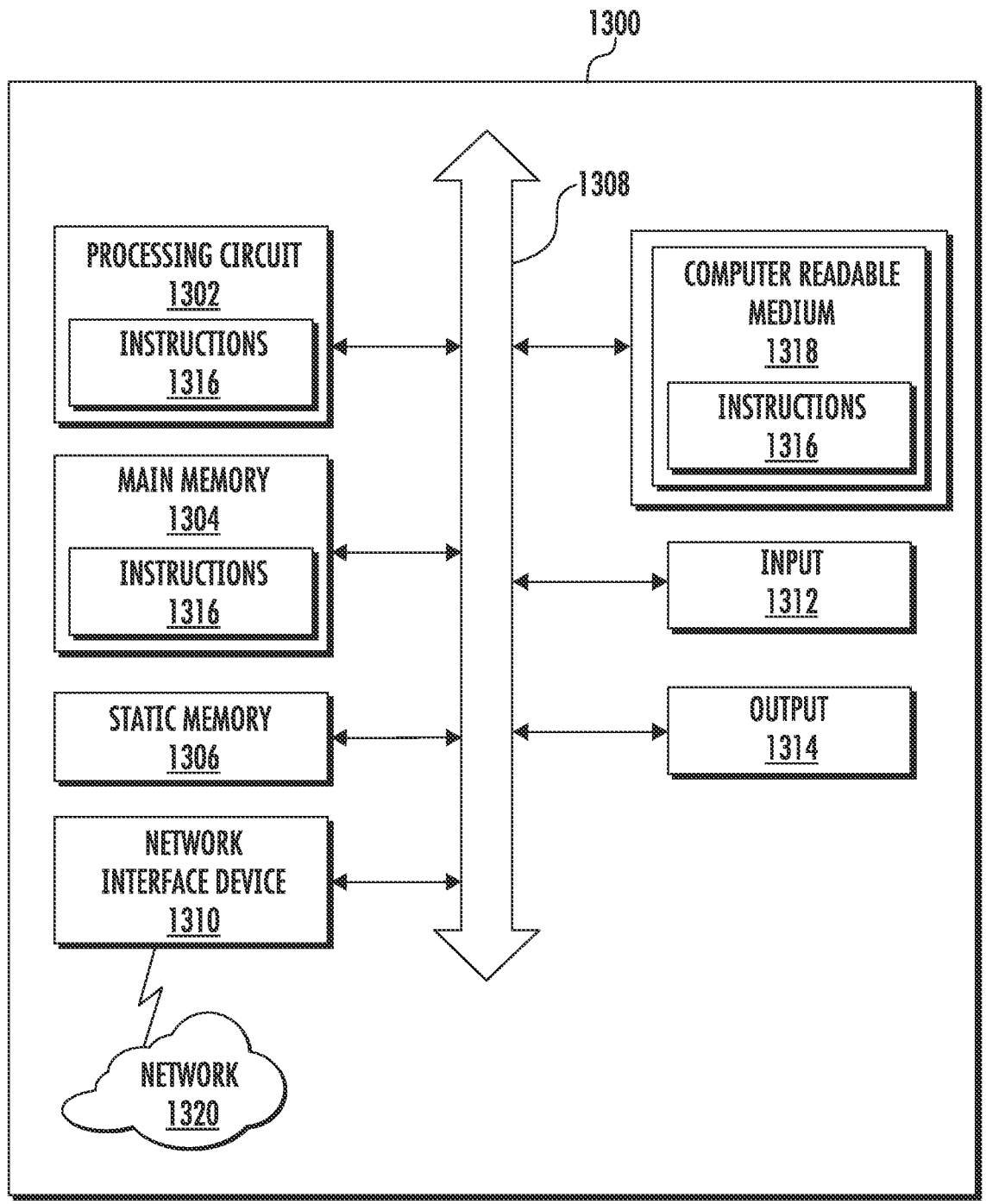
FIG. 13 is a schematic diagram of a representation of an exemplary computer system that can be included in or interfaced with any of the components in the WCS of FIG. 2, the central unit in FIG. 4, and the remote unit in FIG. 7 for supporting downlink and uplink signal compression and noise shaping, wherein the exemplary computer system is configured to execute instructions from an exemplary computer-readable medium.

Any of the circuits in the WCS 200 of FIG. 2, the central unit 400 of FIG. 4, and the remote unit 700 of FIG. 7, such as the control circuit 412, can include a computer system 1300, such as that shown in FIG. 13, to carry out their functions and operations. With reference to FIG. 13, the computer system 1300 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1300 in this embodiment includes a processing circuit or processor 1302, a main memory 1304 (e.g., read-only memory (ROM), flash memory, dynamic random access memory (DRAM) such as synchronous DRAM (SDRAM), etc.), and a static memory 1306 (e.g., flash memory, static random access memory (SRAM), etc.), which may communicate with each other via a data bus 1308. Alternatively, the processing circuit 1302 may be connected to the main memory 1304 and/or static memory 1306 directly or via some other connectivity means. The processing circuit 1302 may be a controller, and the main memory 1304 or static memory 1306 may be any type of memory.

The processing circuit 1302 represents one or more general-purpose processing circuits such as a microprocessor, central processing unit, or the like. More particularly, the processing circuit 1302 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1302 is configured to execute processing logic in instructions 1316 for performing the operations and steps discussed herein.

The computer system 1300 may further include a network interface device 1310. The computer system 1300 also may or may not include an input 1312 to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processing circuit 1302 during execution thereof by the computer system 1300, the main memory 1304 and the processing circuit 1302 also constituting the computer-readable medium 1318. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A central unit in a wireless communications system (WCS), comprising:
a downlink digital compression circuit comprising:
a downlink block compression circuit configured to:
receive at least one downlink digital communications signal sampled based on a downlink sampling bandwidth comprising a downlink in-band bandwidth and a downlink out-band bandwidth;
generate a plurality of downlink sample blocks based on the at least one downlink digital communications signal; and
compress each of the plurality of downlink sample blocks based on a respective one of a plurality of downlink scaling factors to generate a respective one of a plurality of compressed downlink sample blocks; and
a downlink noise shaping circuit configured to cause a downlink compression noise associated with each of the plurality of compressed downlink sample blocks to be redistributed across a selected one of the downlink in-band bandwidth and the downlink out-band bandwidth.

2. The central unit of claim 1, wherein the downlink digital compression circuit comprises a compression protocol interface circuit configured to generate at least one compressed downlink digital communications signal comprising a plurality of downlink protocol data units, the plurality of downlink protocol data units each comprises a respective one of the plurality of compressed downlink sample blocks and a respective one of the plurality of downlink scaling factors.

3. The central unit of claim 2, wherein the downlink digital compression circuit further comprises:
a data buffer configured to generate the plurality of downlink sample blocks from the at least one downlink digital communications signal;
a scaling circuit configured to determine the respective one of the plurality of downlink scaling factors for each of the plurality of downlink sample blocks;
a shaping filter configured to:
receive a respective one of a plurality of downlink quantization error samples associated with each of the plurality of compressed downlink sample blocks; and
generate a respective one of a plurality of downlink noise samples based on each of the plurality of downlink quantization error samples;
a combiner configured to combine each of the plurality of downlink sample blocks with a respective one of the plurality of downlink noise samples to generate a respective one of a plurality of noise-added downlink sample blocks to thereby cause the downlink compression noise associated with each of the plurality of compressed downlink sample blocks to be redistributed to the selected one of the downlink in-band bandwidth and the downlink out-band bandwidth;
a multiplier configured to multiply each of the plurality of noise-added downlink sample blocks with a respective one of the plurality of downlink scaling factors to generate a respective one of a plurality of scaled noise-added downlink sample blocks;
a quantizing circuit configured to compress each of the plurality of scaled noise-added downlink sample blocks to generate a respective one of the plurality of compressed downlink sample blocks;
a dequantizing circuit configured to decompress each of the plurality of compressed downlink sample blocks to generate a respective one of a plurality of scaled noise-added downlink sample feedbacks;
a divider configured to divide each of the plurality of scaled noise-added downlink sample feedbacks by a respective one of the plurality of downlink scaling factors to generate a respective one of a plurality of noise-added downlink sample feedbacks; and
a subtractor configured to:
subtract each of the plurality of noise-added downlink sample feedbacks by a respective one of the plurality of noise-added downlink sample blocks to generate a respective one of the plurality of downlink quantization error samples; and
provide the plurality of downlink quantization error samples to the shaping filter.

4. The central unit of claim 2, further comprising a digital routing circuit coupled to a plurality of remote units via a transport medium, the digital routing circuit is configured to distribute the at least one compressed downlink digital communications signal to a respective one or more of the plurality of remote units via the transport medium.

5. The central unit of claim 4, further comprising a control circuit configured to:
determine whether to redistribute the downlink compression noise to the downlink in-band bandwidth or the downlink out-band bandwidth based on out-band noise filtering capability of the respective one or more of the plurality of remote units;
provide an indication to instruct the downlink digital compression circuit to redistribute the downlink compression noise in each of the plurality of compressed downlink sample blocks to the downlink in-band bandwidth in response to determining that the respective one or more of the plurality of remote units do not have the out-band noise filtering capability; and
provide the indication to instruct the downlink digital compression circuit to redistribute the downlink compression noise in each of the plurality of compressed downlink sample blocks to the downlink out-band bandwidth in response to determining that the respective one or more of the plurality of remote units have the out-band noise filtering capability.

6. The central unit of claim 5, further comprising a storage circuit configured to store an out-band filter configuration for each of the plurality of remote units, wherein the control circuit is further configured to determine the out-band noise filtering capability of the respective one or more of the plurality of remote units based on the stored out-band filter configuration corresponding to the respective one or more of the plurality of remote units.

7. The central unit of claim 4, wherein the digital routing circuit is further configured to receive at least one compressed uplink digital communications signal from the respective one or more of the plurality of remote units via the transport medium, wherein:
the at least one compressed uplink digital communications signal comprises a plurality of uplink protocol data units each comprising a respective one of a plurality of compressed uplink sample blocks and a respective one of a plurality of uplink scaling factors; and the plurality of compressed uplink sample blocks each having an uplink compression noise distributed across an uplink out-band bandwidth.

8. The central unit of claim 7, further comprising an uplink digital decompression circuit, the uplink digital decompression circuit comprises:
- a decompression protocol interface circuit configured to extract the respective one of the plurality of compressed uplink sample blocks and the respective one of the plurality of uplink scaling factors from each of the plurality of uplink protocol data units;
- a decompression dequantizing circuit configured to decompress each of the plurality of compressed uplink sample blocks to generate a respective one of a plurality of scaled noise-added uplink sample blocks; and
- a decompression divider configured to divide each of the plurality of scaled noise-added uplink sample blocks by a respective one of the plurality of uplink scaling factors to generate a respective one of a plurality of noise-added uplink sample blocks each having the uplink compression noise distributed across the uplink out-band bandwidth.

9. The central unit of claim 8, further comprising a rejection filter circuit configured to suppress the uplink compression noise in each of the plurality of noise-added uplink sample blocks.

10. A method for supporting signal compression and noise shaping in a WCS, comprising:
- receiving at least one downlink digital communications signal sampled based on a downlink sampling bandwidth comprising a downlink in-band bandwidth and a downlink out-band bandwidth;
- generating a plurality of downlink sample blocks based on the at least one downlink digital communications signal;
- compressing each of the plurality of downlink sample blocks based on a respective one of a plurality of downlink scaling factors to generate a respective one of a plurality of compressed downlink sample blocks; and
- redistributing a downlink compression noise associated with each of the plurality of compressed downlink sample blocks across a selected one of the downlink in-band bandwidth and the downlink out-band bandwidth.

11. The method of claim 10, further comprising generating at least one compressed downlink digital communications signal comprising a plurality of downlink protocol data units, the plurality of downlink protocol data units each comprises a respective one of the plurality of compressed downlink sample blocks and a respective one of the plurality of downlink scaling factors.

12. The method of claim 11, further comprising:
- determining the respective one of the plurality of downlink scaling factors for each of the plurality of downlink sample blocks;
- receiving a respective one of a plurality of downlink quantization error samples associated with each of the plurality of compressed downlink sample blocks;
- generating a respective one of a plurality of downlink noise samples based on each of the plurality of downlink quantization error samples;
- combining each of the plurality of downlink sample blocks with a respective one of the plurality of downlink noise samples to generate a respective one of a plurality of noise-added downlink sample blocks to thereby cause the downlink compression noise associated with each of the plurality of compressed downlink sample blocks to be redistributed to the selected one of the downlink in-band bandwidth and the downlink out-band bandwidth;
- multiplying each of the plurality of noise-added downlink sample blocks with a respective one of the plurality of downlink scaling factors to generate a respective one of a plurality of scaled noise-added downlink sample blocks;
- compressing each of the plurality of scaled noise-added downlink sample blocks to generate a respective one of the plurality of compressed downlink sample blocks;
- decompressing each of the plurality of compressed downlink sample blocks to generate a respective one of a plurality of scaled noise-added downlink sample feedbacks;
- dividing each of the plurality of scaled noise-added downlink sample feedbacks by a respective one of the plurality of downlink scaling factors to generate a respective one of a plurality of noise-added downlink sample feedbacks; and
- subtracting each of the plurality of noise-added downlink sample feedbacks by a respective one of the plurality of noise-added downlink sample blocks to generate a respective one of the plurality of downlink quantization error samples.

13. The method of claim 11, further comprising distributing the at least one compressed downlink digital communications signal to a respective one or more of a plurality of remote units.

14. The method of claim 13, further comprising:
- determining whether to redistribute the downlink compression noise to the downlink in-band bandwidth or the downlink out-band bandwidth based on an out-band noise filtering capability of the respective one or more of the plurality of remote units;
- redistributing the downlink compression noise in each of the plurality of compressed downlink sample blocks to the downlink in-band bandwidth in response to determining that the respective one or more of the plurality of remote units do not have the out-band noise filtering capability; and
- redistributing the downlink compression noise in each of the plurality of compressed downlink sample blocks to the downlink out-band bandwidth in response to determining that the respective one or more of the plurality of remote units have the out-band noise filtering capability.

15. The method of claim 14, further comprising:
- storing an out-band filter configuration for each of the plurality of remote units; and
- determining the out-band noise filtering capability of the respective one or more of the plurality of remote units based on the stored out-band filter configuration corresponding to the respective one or more of the plurality of remote units.

16. The method of claim 13, further comprising receiving at least one compressed uplink digital communications signal from the respective one or more of the plurality of remote units, wherein:
- the at least one compressed uplink digital communications signal comprises a plurality of uplink protocol data units each comprising a respective one of a plurality of compressed uplink sample blocks and a respective one of a plurality of uplink scaling factors; and the plurality of compressed uplink sample blocks each having an uplink compression noise distributed across an uplink out-band bandwidth.

17. The method of claim 16, further comprising:
extracting the respective one of the plurality of compressed uplink sample blocks and the respective one of the plurality of uplink scaling factors from each of the plurality of uplink protocol data units;
decompressing each of the plurality of compressed uplink sample blocks to generate a respective one of a plurality of scaled noise-added uplink sample blocks; and
dividing each of the plurality of scaled noise-added uplink sample blocks by a respective one of the plurality of uplink scaling factors to generate a respective one of a plurality of noise-added uplink sample blocks each having the uplink compression noise distributed across the uplink out-band bandwidth.

18. The method of claim 17, further comprising suppressing the uplink compression noise in each of the plurality of noise-added uplink sample blocks.

19. A wireless communications system (WCS), comprising a distributed communications system (DCS), the DCS comprising:
a plurality of remote units; and
a central unit coupled to the plurality of remote units via a transport medium, the central unit is configured to:
distribute at least one compressed downlink digital communications signal to a respective one or more of the plurality of remote units; and
receive at least one compressed uplink digital communications signal from the respective one or more of the plurality of remote units;
wherein the central unit comprises a downlink digital compression circuit that comprises:
a downlink block compression circuit configured to:
receive at least one downlink digital communications signal sampled based on a downlink sampling bandwidth comprising a downlink in-band bandwidth and a downlink out-band bandwidth;
generate a plurality of downlink sample blocks based on the at least one downlink digital communications signal; and
compress each of the plurality of downlink sample blocks based on a respective one of a plurality of downlink scaling factors to generate a respective one of a plurality of compressed downlink sample blocks; and
a downlink noise shaping circuit configured to cause a downlink compression noise associated with each of the plurality of compressed downlink sample blocks to be redistributed across a selected one of the downlink in-band bandwidth and the downlink out-band bandwidth.

20. The WCS of claim 19, wherein the central unit further comprises a control circuit configured to:
determine whether to redistribute the downlink compression noise to the downlink in-band bandwidth or the downlink out-band bandwidth based on an out-band noise filtering capability of the respective one or more of the plurality of remote units;
provide an indication to instruct the downlink digital compression circuit to redistribute the downlink compression noise in each of the plurality of compressed downlink sample blocks to the downlink in-band bandwidth in response to determining that the respective one or more of the plurality of remote units do not have the out-band noise filtering capability; and
provide the indication to instruct the downlink digital compression circuit to redistribute the downlink compression noise in each of the plurality of compressed downlink sample blocks to the downlink out-band bandwidth in response to determining that the respective one or more of the plurality of remote units have the out-band noise filtering capability.

21. The WCS of claim 20, wherein the central unit further comprises a storage circuit configured to store an out-band filter configuration for each of the plurality of remote units, wherein the control circuit is further configured to determine the out-band noise filtering capability of the respective one or more of the plurality of remote units based on the stored out-band filter configuration corresponding to the respective one or more of the plurality of remote units.

22. The WCS of claim 19, wherein the downlink digital compression circuit comprises a compression protocol interface circuit configured to generate the at least one compressed downlink digital communications signal comprising a plurality of downlink protocol data units, the plurality of downlink protocol data units each comprises a respective one of the plurality of compressed downlink sample blocks and a respective one of the plurality of downlink scaling factors.

23. The WCS of claim 22, wherein the respective one or more of the plurality of remote units each comprising:
a downlink decompression circuit comprising:
a decompression protocol interface circuit configured to extract the respective one of the plurality of compressed downlink sample blocks and the respective one of the plurality of downlink scaling factors from each of the plurality of downlink protocol data units;
a decompression dequantizing circuit configured to decompress each of the plurality of compressed downlink sample blocks to generate a respective one of a plurality of scaled noise-added downlink sample blocks; and
a decompression divider configured to divide each of the plurality of scaled noise-added downlink sample blocks by a respective one of the plurality of downlink scaling factors to generate a respective one of a plurality of noise-added downlink sample blocks each having the downlink compression noise distributed across the selected one of the downlink in-band bandwidth and the downlink out-band bandwidth; and
an uplink compression circuit comprising:
an uplink block compression circuit configured to:
receive at least one uplink digital communications signal sampled based on an uplink sampling bandwidth comprising an uplink in-band bandwidth and an uplink out-band bandwidth;
generate a plurality of uplink sample blocks based on the at least one uplink digital communications signal; and
compress each of the plurality of uplink sample blocks based on a respective one of a plurality of uplink scaling factors to generate a respective one of a plurality of compressed uplink sample blocks; and
an uplink noise shaping circuit configured to cause an uplink compression noise associated with each of the plurality of compressed uplink sample blocks to be redistributed across the uplink out-band bandwidth.

24. The WCS of claim 23, wherein the respective one or more of the plurality of remote units each further comprises a rejection filter to suppress the downlink compression noise associated with each of the plurality of noise-added downlink sample blocks in the downlink out-band bandwidth.

25. The WCS of claim 19, wherein:
the central unit comprises:
an electrical-to-optical (E/O) converter configured to convert the at least one compressed downlink digital communications signal into at least one compressed downlink optical communications signal; and
an optical-to-electrical (O/E) converter configured to convert at least one compressed uplink optical communications signal into the at least one compressed uplink digital communications signal; and
the respective one or more of the plurality of remote units each comprises:
a respective O/E converter configured to convert the at least one compressed downlink optical communications signal into the at least one compressed downlink digital communications signal; and
a respective E/O converter configured to convert the at least one compressed uplink digital communications signal into the at least one compressed uplink optical communications signal.

* * * * *